US011547158B2

(12) United States Patent
Mini Townson et al.

(10) Patent No.: US 11,547,158 B2
(45) Date of Patent: Jan. 10, 2023

(54) FLUID-ACTUATED IMPACT PROTECTION SYSTEM AND METHOD

(71) Applicant: Titon Ideas, Inc., Clayton Panama (PA)

(72) Inventors: Juan Francisco Javier Mini Townson, Guatemala (GT); Jose Rodrigo Aragon Cabrera, Santa Catarina Pinula (GT); Juan Pablo Alfaro Samayoa, Guatemala (GT)

(73) Assignee: Titon Ideas, Inc., Panama (PA)

( * ) Notice: Subject to any disclaimer, the term of this patent is extended or adjusted under 35 U.S.C. 154(b) by 288 days.

(21) Appl. No.: 16/757,291

(22) PCT Filed: Oct. 11, 2018

(86) PCT No.: PCT/IB2018/057871
§ 371 (c)(1),
(2) Date: Apr. 17, 2020

(87) PCT Pub. No.: WO2019/073425
PCT Pub. Date: Apr. 18, 2019

(65) Prior Publication Data
US 2021/0360991 A1 Nov. 25, 2021

Related U.S. Application Data

(60) Provisional application No. 62/572,409, filed on Oct. 13, 2017.

(51) Int. Cl.
*A42B 3/12* (2006.01)
*A41D 13/015* (2006.01)
(Continued)

(52) U.S. Cl.
CPC ............ *A41D 13/015* (2013.01); *A42B 3/121* (2013.01); *F41H 1/02* (2013.01); *F41H 1/04* (2013.01); *F41H 5/013* (2013.01)

(58) Field of Classification Search
CPC .......... A42B 3/121; F41H 1/04; A41D 13/015
See application file for complete search history.

(56) References Cited

U.S. PATENT DOCUMENTS 3,039,109 A * 6/1962 Simpson ................ A42B 3/121
2/413
3,849,801 A 11/1974 Holt
(Continued)

*Primary Examiner* — Tajash D Patel
(74) *Attorney, Agent, or Firm* — Eugenio J. Torres-Oyola; Victor M. Rodriguez-Reyes; Rafael Rodriguez-Muriel

(57) ABSTRACT

The subject disclosure describes, among other things, illustrative embodiments of an impact protection device that comprises the following elements: a machine, a protective structural member, and a fluid holding member. The impact protection device is designed to protect a user from an impact to the protective structural member by dissipating a portion of the kinetic energy of the impact. Machine operation translates into a controlled movement between elements of the impact protection device that deform the fluid holding member, thereby displacing a fluid. This controlled movement also dictates a throttling profile that regulates the amount of damping; thereby managing the portion of kinetic energy dissipated. The machine can be a mechanical assembly incorporating levers, cams and or computerized controllers.

8 Claims, 18 Drawing Sheets

(51) Int. Cl.
*F41H 1/02* (2006.01)
*F41H 1/04* (2006.01)
*F41H 5/013* (2006.01)

(56) References Cited

U.S. PATENT DOCUMENTS

| | | | |
|---|---|---|---|
| 3,872,511 A * | 3/1975 | Nichols | A42B 3/121 |
| | | | 267/114 |
| 4,354,284 A * | 10/1982 | Gooding | A42B 3/121 |
| | | | 2/413 |
| 7,774,866 B2 * | 8/2010 | Ferrara | B32B 5/18 |
| | | | 2/455 |
| 9,750,297 B1 | 9/2017 | Mini Townson et al. | |
| 2005/0268383 A1 | 12/2005 | Harris | |
| 2008/0250548 A1 | 10/2008 | Stuhmiller | |
| 2013/0042397 A1 | 2/2013 | Halldin | |
| 2013/0081189 A1 | 4/2013 | Chiang | |
| 2013/0152287 A1 | 6/2013 | Cormier | |
| 2013/0232668 A1 | 9/2013 | Suddaby | |
| 2014/0000011 A1 | 1/2014 | Johnson | |
| 2017/0215507 A1 | 8/2017 | Straus | |
| 2018/0042326 A1 * | 2/2018 | Mini Townson | A42B 3/14 |
| 2021/0076769 A1 * | 3/2021 | Kirshon | A42B 3/121 |
| 2021/0219635 A1 * | 7/2021 | Pascua | F16F 3/04 |

* cited by examiner

200

200

200

200

200

200

200

SECTION A - A

DETAIL B

SECTION C - C

DETAIL D

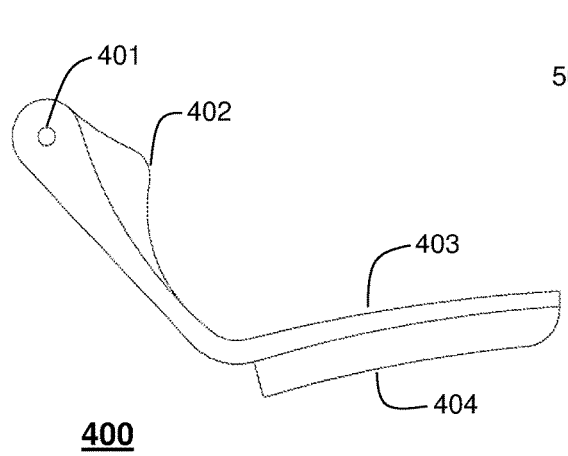
400
FIG. 4
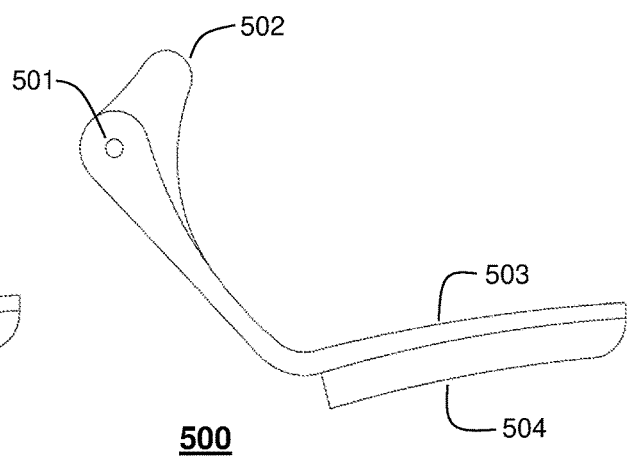
500
FIG. 5
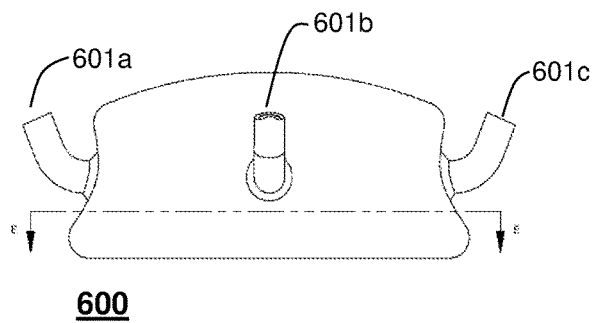
600
FIG. 6A
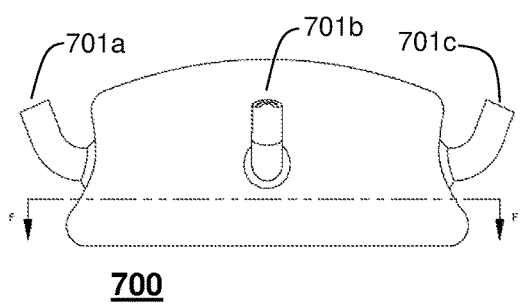
700
FIG. 7A
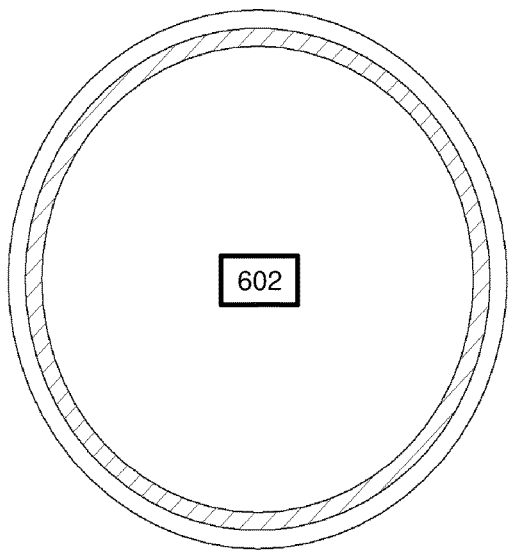
600
FIG. 6B   SECTION E - E
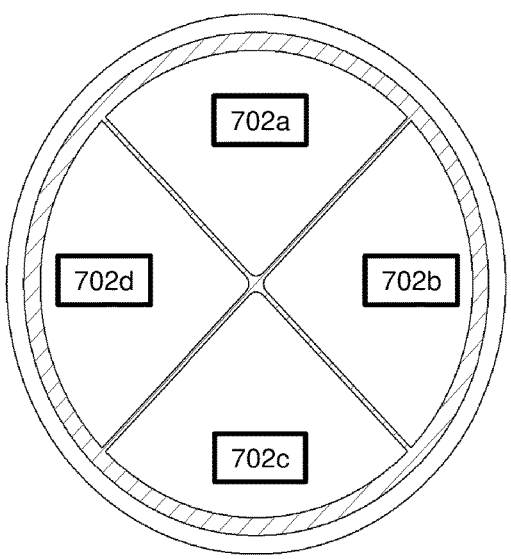
700
FIG. 7B   SECTION F - F

1700

1710

1800

1820

1840

1900

FLUID-ACTUATED IMPACT PROTECTION SYSTEM AND METHOD

FIELD OF THE DISCLOSURE

The subject disclosure relates to a fluid-actuated impact protection system and method.

BACKGROUND

Safety equipment, such as helmets, generally reduce effects of impacts or shock to a user's body, e.g., a top and/or side of a user's head as may be encountered during a collision event. Protective equipment often relies upon a hard outer casing with an impact-energy absorbing padding or a strap based suspension placed between the outer casing and the user's body. If a user wearing a hard shelled helmet suffers a major blow to the helmet, the impact of the hard shell meeting a hard surface generates a shockwave and a high impact force, that can be mitigated (to a limited extent) by deformation of the outer casing, the inner shock-absorbing material, and/or the straps in a typical suspension inside the hard casing and in contact with the user's head.

With respect to the head, various mechanisms responsible for brain injuries are understood to include focal type injuries that generally result from a direct impact to the head, sometimes resulting in cranial fracture. Other mechanisms include coup injuries that result from impacts to the same side of the head, whereas, contrecoup injuries result from impacts to an opposite side of the head. At least some injuries result from a displacement, e.g., a linear translation, of the brain within the skull. Still other injuries, including Diffuse Axonal Injuries (DAI), result from a rotational acceleration of the head and/or severe acceleration and/or deceleration that causes traumatic shearing forces, e.g., tissue sliding over tissue. DAI is believed to be one of the most common and devastating types of traumatic brain injury.

Some have disclosed energy absorbing protection systems. For example, U.S. Pat. No. 7,213,497 to Garcia et al., discloses an inflatable trajectory altering and blast energy absorption system having a plenum with walls that are spaced apart from one another and including means for altering a trajectory of a projectile entering the plenum. For example, U.S. Pat. No. 6,997,218 to Garcia et al., discloses an inflatable body armor system that include an inflatable flexible/sealable plenum that include a variety of lines, shaped objects and/or fabric sheets dispersed in the plenum to alter a trajectory of a projectile entering the plenum. For example, U.S. Pat. No. 8,863,320 to Kelly et al., discloses an athletic helmet including impact-absorbing pads that define an interior volume and include a valve to restrict a flow of a fluid from the interior volume to the exterior.

Others have disclosed shock reduction buffers. For example, U.S. Pat. App. Pub. No. 2008/0250548 to Stuhmiller et al., discloses a cushion for use in a helmet or body armor to mitigate shock loads (i.e., blasts or blunt impact) against the human body. According to Stuhmiller, the matrix has a plurality of deformable fluid pockets that can be reconfigured (e.g., emptied). Stuhmiller further discloses a vent that connects each fluid pocket to at least one receiver pocket, and a valve imbedded into the vent to control fluid flow through the vent, such that when a cushion receives a shock load, fluid in the cushion is transferred to reconfigure the cushion for mitigation of the resultant forces. For example, U.S. Pat. App. Pub. No. 2008/0251332 to Stuhmiller et al., discloses a device for mitigating shock loads that utilizes load-fitted and form-fitted fluid capsules, each fluid capsule including a valve through a membrane to allow fluid flow between fluid capsules when a pressure on the valve exceeds a predetermined level.

Although these and other conventional impact absorbers have worked well, they have failed to provide protection against both high and low degrees of impact imparted on a protection device, such as a helmet, over the extended life of the protection device. The impact force is often so great that the user's helmet may even initially bounce back upon impact, thrusting the user's head away from the blow, subjecting the head and neck regions to additional injury causing forces. If the impact is severe enough, it may lead to a concussion (striking of the brain matter to the skull with moderate force) or worse. In some instances, a user can experience a, so called, focal type of injury, e.g., resulting from a lateral movement of head when the shell is impacted, alone or in combination with a rotation of the head, in which the head experiences a rapid acceleration and/or deceleration.

BRIEF DESCRIPTION OF THE DRAWINGS

FIG. 4 depicts a front view of an illustrative embodiment of a machine incorporating a cam profile;

FIG. 5 depicts a front view of another illustrative embodiment of a machine incorporating a cam profile;

FIGS. 6A & 6B depict front and section E-E views of a fluid reservoir;

FIGS. 7A & 7B depict front and section F-F views of a chambered fluid reservoir;

DETAILED DESCRIPTION

Figure 1A:
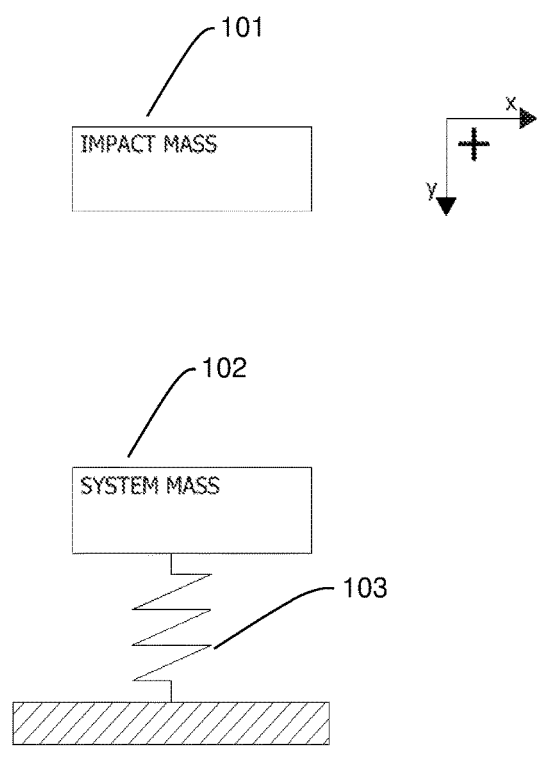
FIG. 1A depicts an ideal spring, mass model.

The subject disclosure describes, among other things, illustrative embodiments of an impact protection device that comprises the following elements: a machine, a protective structural member, and a fluid holding member. The impact protection device is designed to protect a user from an impact to the protective structural member by dissipating a portion of the kinetic energy of the impact. Machine operation translates into a controlled movement between elements of the impact protection device that deform the fluid holding member, thereby displacing a fluid. This controlled movement also dictates a throttling profile that regulates the amount of damping; thereby managing the portion of kinetic energy dissipated. The machine can be a mechanical assembly incorporating levers, cams and or computerized controllers.

The subject disclosure describes, among other things, illustrative embodiments of systems that incorporate various impact protection devices as discussed above. Combinations of modules can be used to transfer at least a portion of the kinetic energy of an impact to a second region of the protected body. At least a portion of an impact or shock force applied along a first direction to an external surface of the structural member, is transformed to other redistributed forces that are applied to the body along different directions based on the remote performance of work.

Controlled movement, as disclosed here, refers to an intended action by the machine. A relatively chaotic input, such as an impact, can be translated to a specific motion and or a set of motions. One or more of the intended actions can be used as a design parameter, e.g., in designing a system based on one or more of an intended application, e.g., a construction helmet, a football helmet, a shield, body armor, and the like.

By way of example, a controlled movement can include a translation according to a predetermined direction and/or orientation of at least one portion of the modules and/or modular components disclosed herein, such as fluid holding members, fluid pipes, valves, sensors, processors, mechanical linkages, levers, gears, planes, protective structural members and the like, in response to a blunt or impact force. Alternatively or in addition, controlled movement can include motions subject to predetermined constraints. By way of non-limiting example, such predetermined constraints can include a constrained distance of travel, a constrained rotation or pivot of a linkage, a constrained deformation of a fluid holding member, and the like. Such constraints can include one or more of a constrained distance or range of distances, a constrained angle or range of angles, a constrained deformation, and the like.

A fluid holding member, as disclosed here, can include an enclosed cavity or chamber, sometimes referred to as a reservoir, a fluid chamber or fluid capsule. The fluid capsule is adapted to hold or otherwise contain a fluid that may or may not be under pressure, and includes at least one orifice, sometimes referred to as an aperture, a vent, a fluid port, and the like, to facilitate a transfer of fluid into and or out of the fluid capsule. Alternatively or in addition, the fluid holding member can include a cellular structure, such as an open cell foam and or a closed cell foam.

The fluid capsule can be constructed using flexible membrane defining an interior volume adapted to retain a material, such as a fluid. In general, the fluid can include a liquid, a gas or a combination of a liquid and a gas. The flexible membrane can incorporate mechanical characteristics, for example, a resiliency, designed to facilitate fluid capsule deformation and recovery after an impact event.

Damping, as disclosed here, refers to incorporating systems and or process that dissipate energy. For example, friction irreversibly transforms energy into heat. By way of non-limiting example, damping can be increased by throttling the flow, e.g., by reducing the principal dimension of a pipe that transports fluid. Other forms of damping work with specific characteristics of fluids, e.g., damping can be varied by changing a viscosity, as with magnetorheological fluids.

Dampers are incorporated into devices and or systems designed to resist impacts to change their impact response. For example, system recovery can be managed by the amount of damping present in the system.

A protective structural member, as disclosed here, refers to a member designed to receive an impact. By way of non-limiting example, the protective structural member can be a unitary helmet shell or a portion of a helmet shell. It is further understood that one or more of the protective structural members can be formed as a unitary member, e.g., according to one or more of molding, casting and/or machining processes. Alternatively or in addition, one or more of the protective structural members can be formed as an assembly, in which one or more elements of the structural member, e.g., a shell portion, proximal attachments, the pivot extensions, and the like can be formed as an assembly. The assembly can include the use of one or more mechanical fasteners, chemical fasteners, thermal or welding techniques, and combinations thereof. Mechanical fasteners can include, without limitation, screws, nails, staples, snap fit engagements, and the like.

The protective structural member is also referred to as an outer shell, a shield, a protective plate, an armor segment, a shell segment and the like.

One or more aspects of the subject disclosure include an impact protection device, comprising an outer structural member and an inner, body-facing structural member disposed opposite and spaced apart from the outer structural member. The spacing between the outer structural member and the inner structural member determines a deceleration stroke. This stroke determines the minimum force required to stop the impact mass approaching at a given velocity. A machine, in combination with energy transforming devices, are operatively coupled to one of the outer structural member, the inner, body-facing structural member or both, wherein actuation of the machine facilitates a controlled movement between the outer structural member and the inner, body-facing structural member. A fluid holding member is disposed at least partially between the outer structural member and the inner, body-facing structural member, wherein the fluid holding member includes a fluid port. The controlled movement between the outer structural member and the inner, body-facing structural member deforms the fluid holding member, with a corresponding transfer of fluid through the fluid port. The fluid holding member confines a volume of fluid, and is designed to utilize the pressure of the fluid as a force response medium. By throttling the port, controlled movement between the outer structural member and inner structural member increases the pressure inside the fluid holding member, thereby increasing its force response. Increasing the principal dimension of the port, for example, its diameter, reduces the pressure attained in the fluid holding member, thus reducing its force response. Both actions, throttling the port and/or increasing its principal dimension, can be obtained through machine actuation.

One or more aspects of the subject disclosure include an impact protection system, having multiple protection modules as described above, from now on named fluid actuated protection modules, each adapted for positioning in association with a respective portion of a protected body. At least one fluid link in fluid communication with the fluid port of at least some of the multiple fluid actuated protection modules, routes a flow of fluid between the at least some of the multiple fluid actuated protection modules, wherein at least a portion of a fluid contained with the fluid holding member of the first one of the multiple fluid actuated protection modules is transferred to at least one other of the multiple fluid actuated protection modules to obtain a fluid transfer responsive to a shock, blunt force or impact load applied to the first one of the multiple fluid actuated protection modules. Responsive to the fluid transfer, the at least one other of the multiple fluid actuated protection modules applies at least a portion of the impact load to a respective portion of the protected body associated with the at least one other of the multiple fluid actuated protection modules.

One or more aspects of the subject disclosure include a process that includes receiving, by a system, an impact force at a local region of a body responsive to an impact encountered at an external surface of a first fluid actuated module containing a fluid. A portion of the fluid is redistributed responsive to the collision force. The redistribution includes expelling the fluid to the environment, and or displacing the fluid through a circuit. A second fluid actuated module is actuated responsive to the redistributing of the portion of the fluid, wherein the actuating of the second fluid module performs work resulting in a transfer of at least a portion of the collision or impact energy towards a remote region of the body.

FIG. 1A depicts a spring 103, mass 102 model. Devices and processes that mitigate shocks by incorporating springs, transform the kinetic energy of the impact into potential strain energy. System response depends on spring distortion.

Figure 1B:
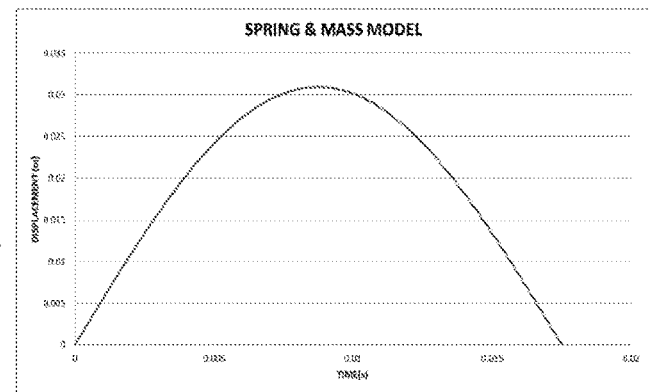
FIGS. 1B & 1C depict, respectively, a displacement vs time and velocity vs time curve of the impact response of the ideal spring, mass model shown in FIG. 1A.

FIG. 1B depicts a displacement vs time curve generated from the impact response of the spring, mass model 100 shown in FIG. 1A. As an example, system mass 102 translates about 30 mm.

Figure 1C:
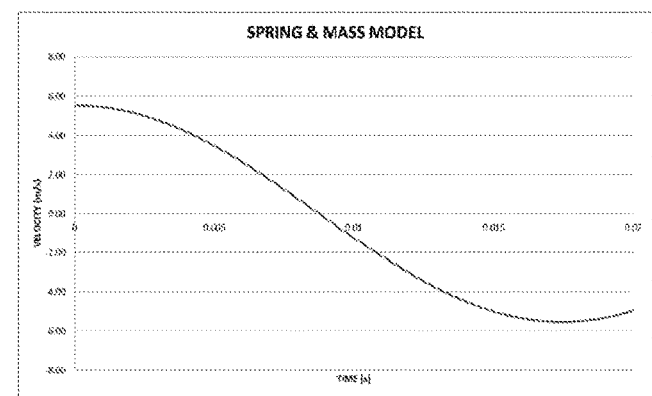

FIG. 1C depicts a velocity vs time curve generated from the impact response of the spring, mass model 100 shown in FIG. 1A. As an example, impact velocity is 5.5 mis just before impact, and all the potential energy of the spring is transformed to kinetic energy after the impact.

Figure 2B:
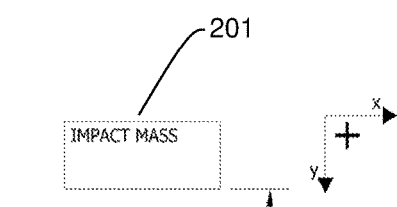
FIGS. 2B & 2C depict, respectively, a displacement vs time and velocity vs time curve of the impact response of the ideal spring, damper, mass model shown in FIG. 2A, for the critical damping case.
Figure 2B:
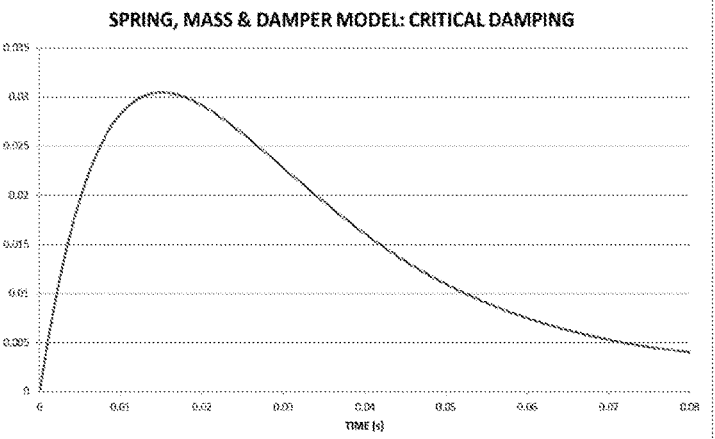
Figure 2A:
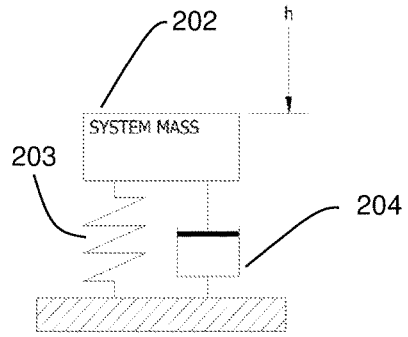
FIG. 2A depicts and ideal spring, damper, mass model.

FIG. 2A depicts a spring 203, damper 204, mass 202 model. Devices and processes that mitigate shocks by incorporating springs and dampers, transform the kinetic energy of the impact into potential strain energy (spring action) and heat (damper action). System response depends on the amount on distortion and the rate of distortion.

Models that incorporate springs and dampers, as model 200 shown in FIG. 2A can have critical damping, overdamping and underdamping. The amount of damping dictates the portion of the kinetic energy of the impact that is dissipated, e.g., transformed into heat.

Figure 2C:
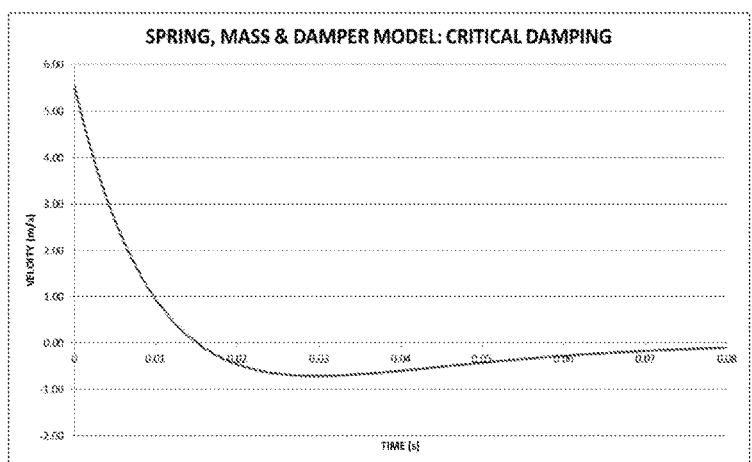
Figure 2D:
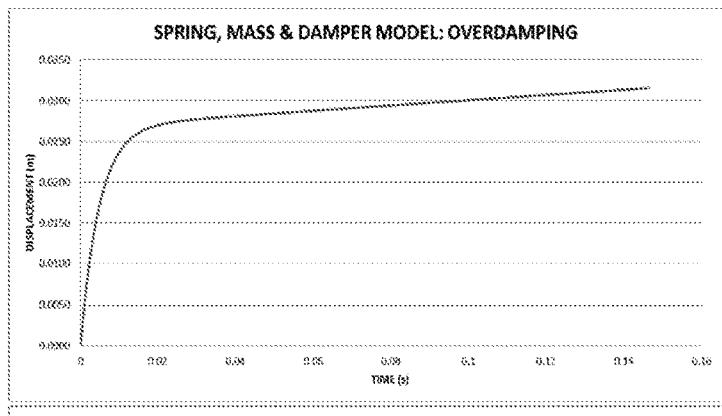
FIGS. 2D & 2E depict, respectively, a displacement vs time and velocity vs time curve of the impact response of the ideal spring, damper, mass model shown in FIG. 2A, for the over damping case.
Figure 2E:
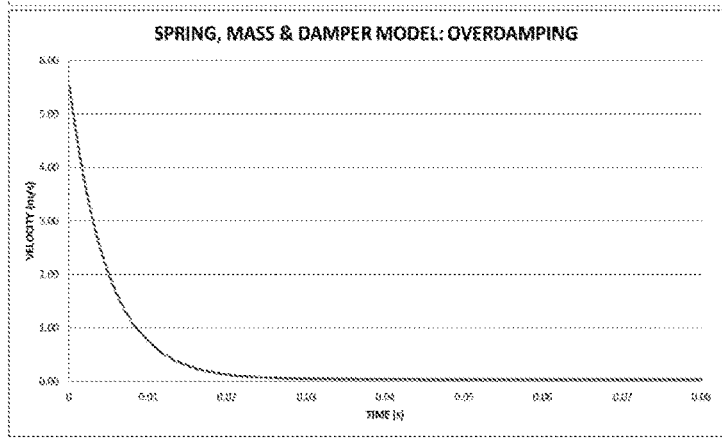
Figure 2F:
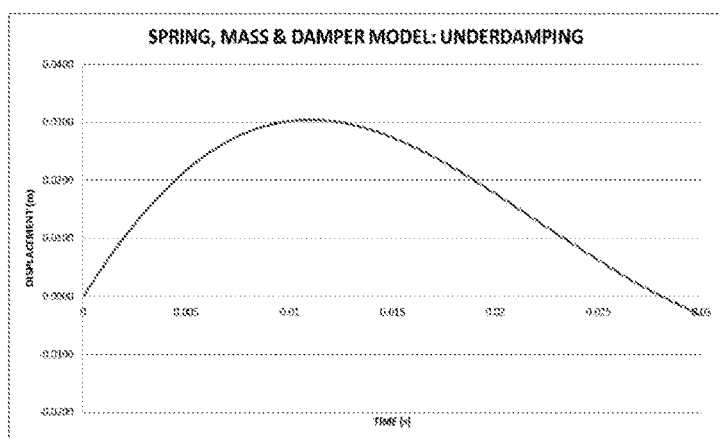
FIGS. 2F & 2G depict, respectively, a displacement vs time and velocity vs time curve of the impact response of the ideal spring, damper, mass model shown in FIG. 2A, for the under damping case.

FIGS. 2B, 2D & 2F depict displacement vs time curves generated from the impact response of the spring, damper, mass model 200 shown in FIG. 2A with different amounts of damping. FIG. 2B shows a system with critical damping, FIG. 2D shows a system with overdamping and FIG. 2F shows a system with under damping. For every case, system mass 202 translates about 30 mm.

Figure 2G:
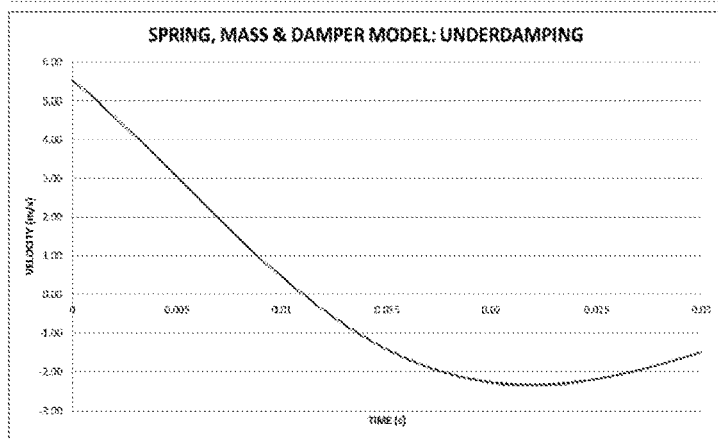

FIGS. 2C, 2E & 2G depict velocity vs time curves generated from the impact response of the spring, damper, mass model 200 shown in FIG. 2A with different amounts of damping. FIG. 2B shows a system with critical damping, FIG. 2D shows a system with overdamping and FIG. 2F shows a system with under damping. For every case, impact velocity before impact is 5.5 m/s.

Figure 20:
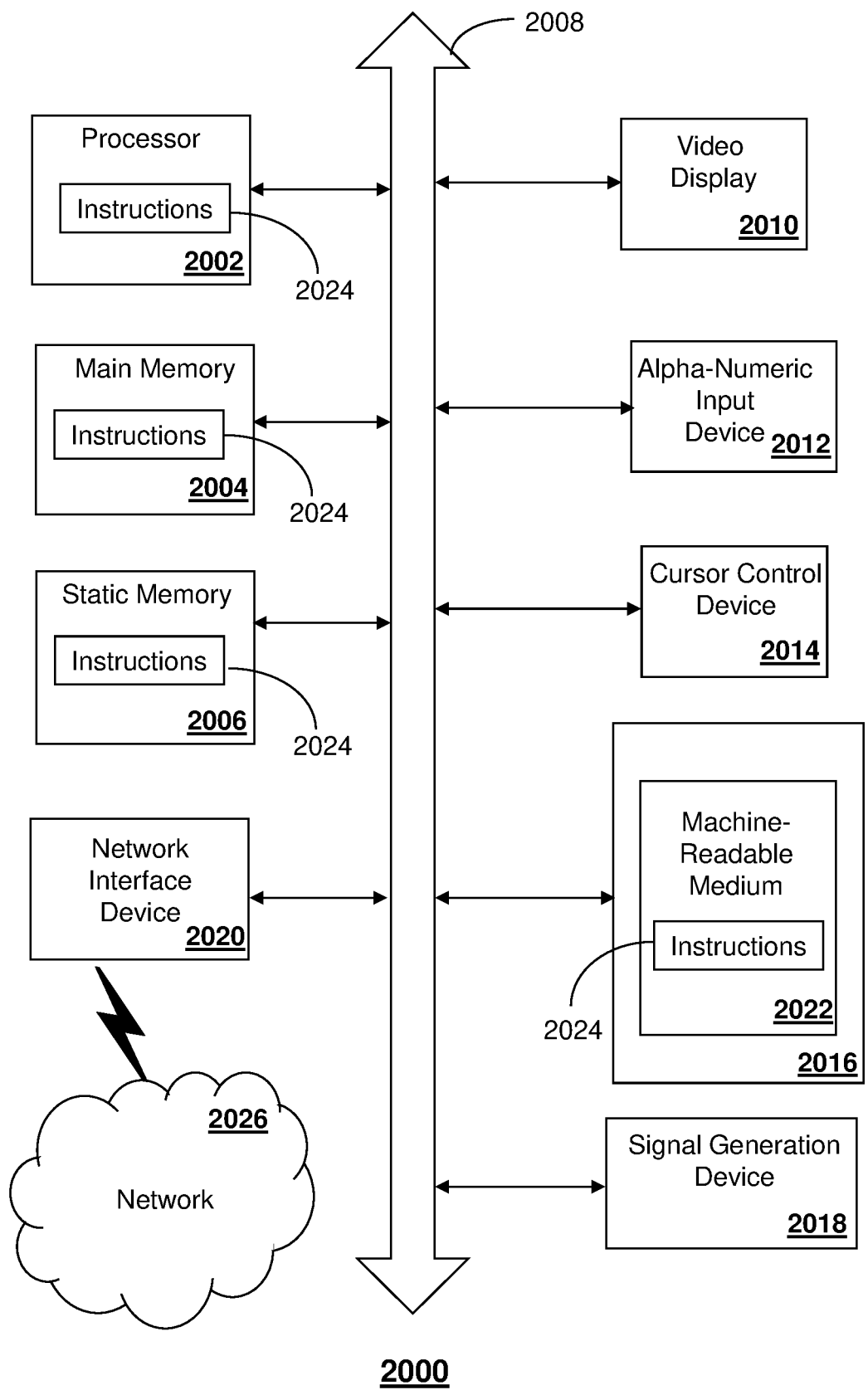
FIG. 20 is a diagrammatic representation of a machine in the form of a computer system within which a set of instructions, when executed, may cause the machine to perform any one or more of the methods described herein.

For the system 200 depicted in FIGS. 20 and 2E practically all the kinetic energy of the impact is translated into heat; there is no stored potential energy for the system to regain its original, pre-impact configuration.

For the system 200 depicted in FIGS. 2F and 2G, a portion of the kinetic energy of the impact is transformed into heat, while another portion is stored as potential energy. Stored potential energy can be used by the system to regain its original, pre-impact configuration. Potential energy can be in the form of mechanical strain energy and or fluid potential energy (pressure).

Several tests have been designed to assess the characteristics of different protective equipment. For example, regarding helmets, different standards exist: NOCSAE (National Operating Committee on Standards for Athletic Equipment) includes "Standard Performance Specification for Newly Manufactured Football Helmets" and ANSI/ISEA (American National Standards Institute I International Safety Equipment Association) "American National Standard For Industrial Head Protection". These standards require different types of impact testing, such as Force Transmission and Impact Energy Attenuation. Impacts are defined according to the following parameters: impact mass and impact velocity. Both parameters dictate the amount of distortion and the rate of distortion.

Figure 3A:
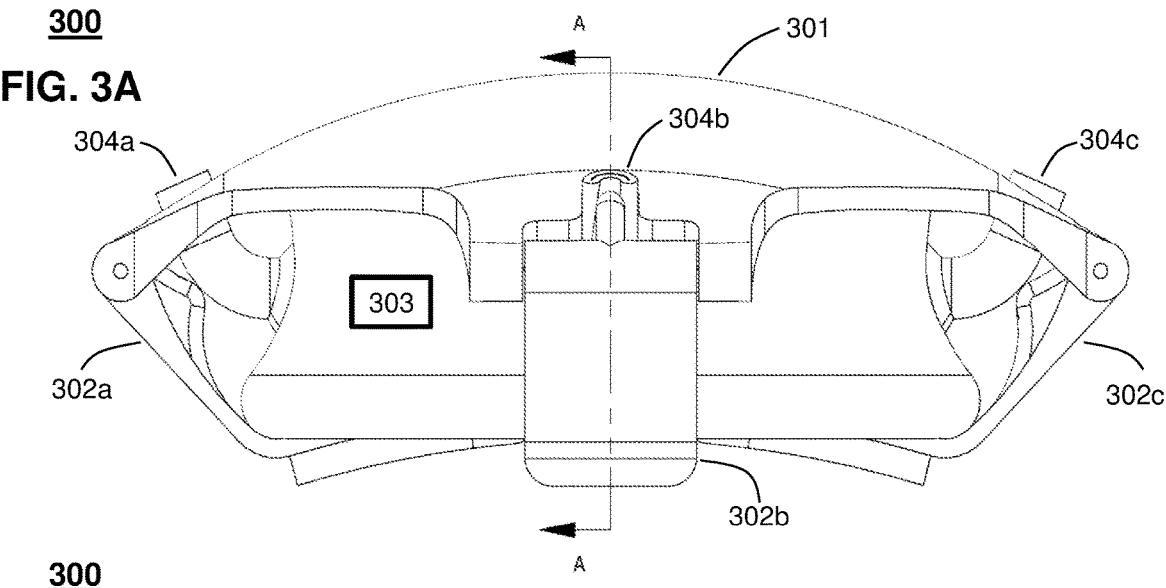
FIGS. 3A & 3B depict front and section A-A views of an illustrative embodiment of a fluid-displacement impact protection module incorporating machines.

FIG. 3A depicts a front view of an impact protection device 300. The device comprises a protective structural member 301, also referred to as an outer shell, and a machine composed of and array of levers 302a, 302b, 302c, 302d (not shown), generally 302, and operatively coupled to structural member 301. A fluid holding member 303 is located between the outer structural member 301 and the machines 302. The fluid holding member includes at least one outlet port 304 and at least one internal chamber. Ports 304a, 304c are designed as normally open ports, while ports 304b and 304d (not shown) are designed as normally closed ports. The outlet port and the chamber area are designed to dictate the impact response of the impact protection device. Kinetic energy of the impact can be transformed to potential energy by closing the outlet port, as in ports 304b and 304d. Kinetic energy of the impact can be transformed to heat by throttling the outlet port, as in ports 304a and 304c.

Figure 3B:
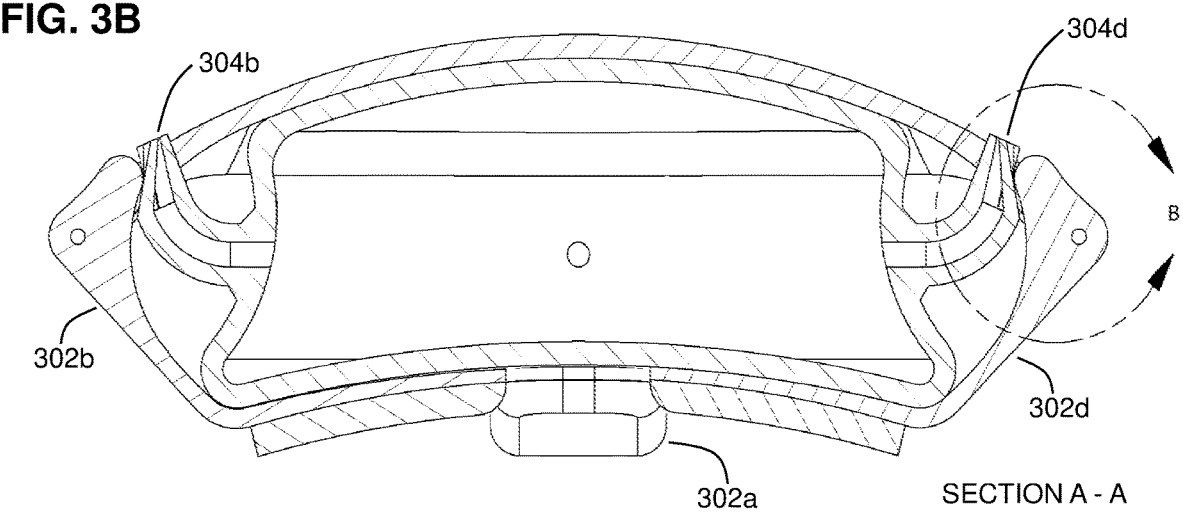
Figure 3C:
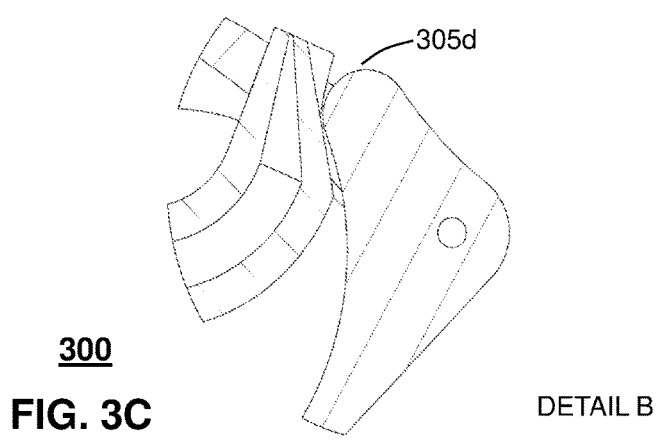
FIG. 3C depicts detail B of FIG. 3B, where a cam profile integral to a lever dictates throttling of the fluid port; cam and outlet port interaction is shown in the normally closed position.
Figure 3D:
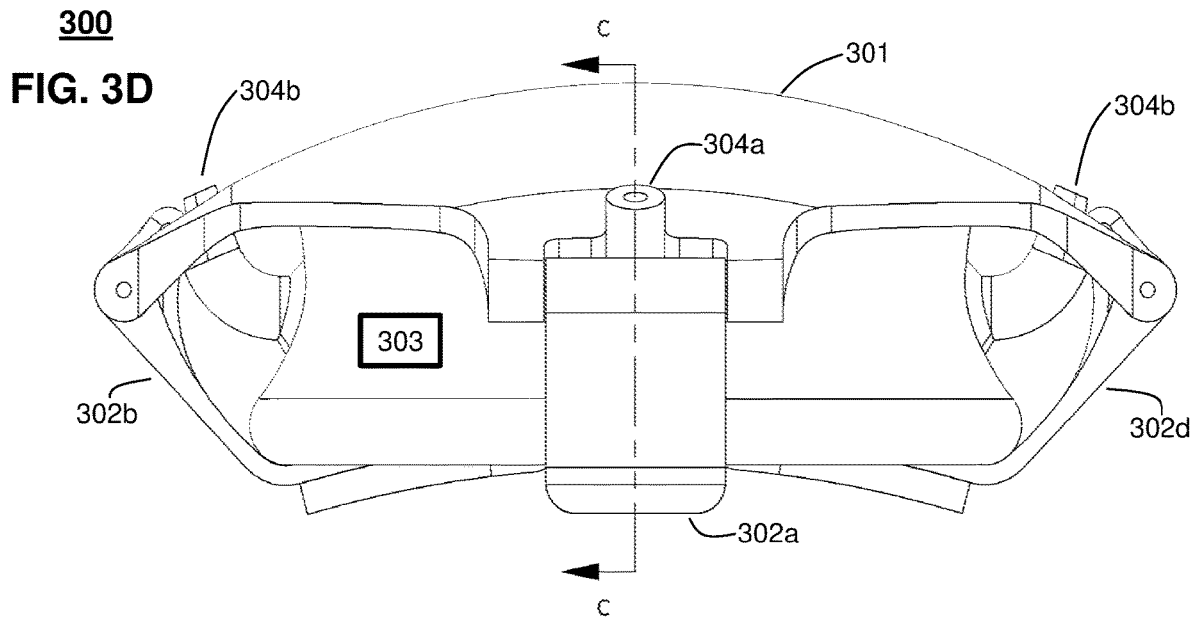
FIGS. 3D & 3E depict lateral and section C-C views of the illustrative embodiment of a fluid-displacement impact protection module incorporating machines shown in FIGS. 3A & 3B.

FIG. 3B depicts section view A-A of impact protection device 300. As shown, the machine comprises a lever array 302a, 302b, 302c (not shown), 302d. Each lever 302 of the lever array is designed to contact the fluid holding member 303. The lever also incorporates a cam profile 305d, designed to open the outlet port of the fluid holding member, as shown in FIG. 3C, as the lever rotates.

FIG. 3O depicts a lateral view of the impact protection device 300.

Figure 3E:
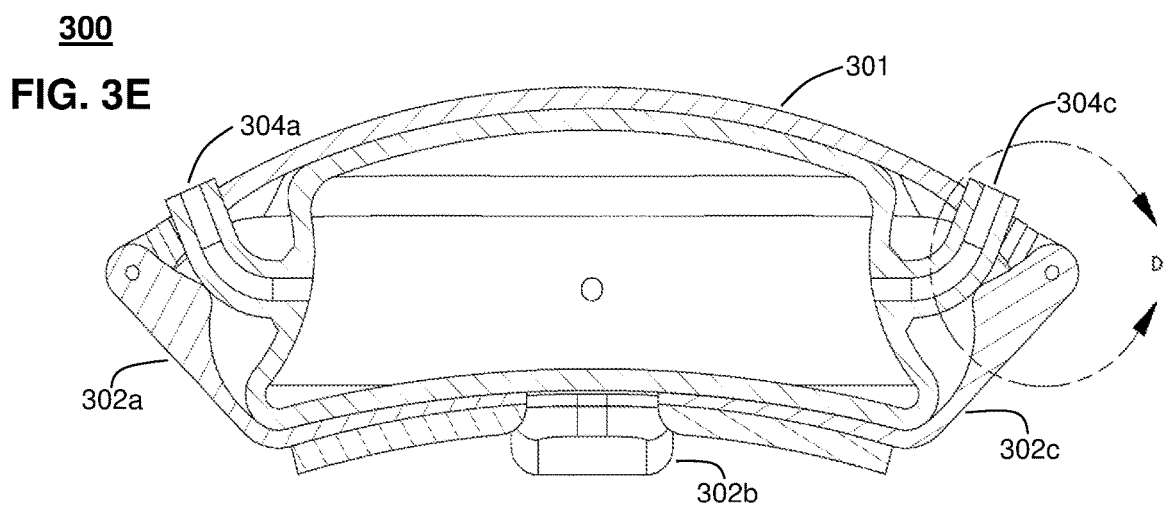

FIG. 3E depicts section view C-C of the impact protection device 300. The cam profile of levers 302a, 302c is incorporated directly into the levers, and the pre-impact position of the levers has no interaction with the outlet ports 304a, 304c of the fluid holding member 303, as shown in FIG. 3E. At impact conditions, the levers rotate and the cam engages the outlet port, thus throttling the fluid flow.

Figure 3F:
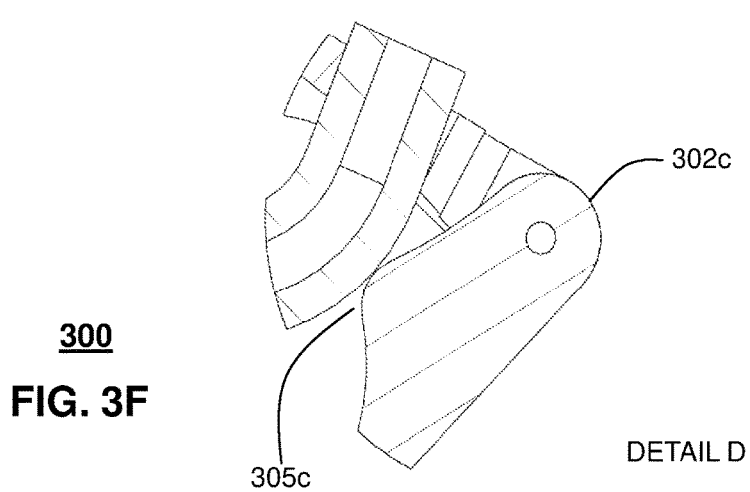
FIG. 3F depicts detail D of FIG. 3E, where a cam profile integral to a lever dictates throttling of the fluid port; cam and outlet port interaction is shown in the normally open position.

FIG. 3F shows lever 302c and cam profile 305c in the normally open position.

FIG. 4 depicts an embodiment of a typical lever used in the impact protection device 300. The lever includes a pivot 401 to operatively connect to the outer shell by means of an axle. Cams 402 can be incorporated directly into the lever, extensions 403 can be designed to accommodate at least part of the fluid holding member. In cases where the lever touches part of the protected body, padding 404 can be incorporated to the lever for comfort.

FIG. 5 depicts an embodiment of a typical lever used in the impact protection device 300. The lever includes a pivot 501 to operatively connect the lever to the outer shell by means of an axle. Cams 502 can be incorporated directly into the lever, extensions 503 can be designed to accommodate at least part of the fluid holding member. In cases where the lever touches part of the protected body, padding 504 can be incorporated to the lever for comfort.

FIG. 6A shows a front view of an illustrative embodiment 600 of the fluid holding member 303 of the impact protection module 300. Fluid holding member 600 comprises a single fluid chamber 602 with four outlets or ports 601a, 601b, 601c (port 601d not shown). Different configurations can incorporate different number of ports. FIG. 6B shows section view E-E of fluid holding member 600.

FIG. 7A shows a front view of another illustrative embodiment 700 of the fluid holding member 303 of the impact protection module 300.

FIG. 7B shows section view F-F of fluid holding member 700. Fluid holding member 700 comprises a subdivided fluid chamber 702a, 702b, 702c, 702d, generally 702, with four outlets or ports 701a, 701b, 701c (port 701d not shown). Even though subdivisions 702 have the same dimensions, different subdivisions can have different volumes and or shapes.

Figure 8A:
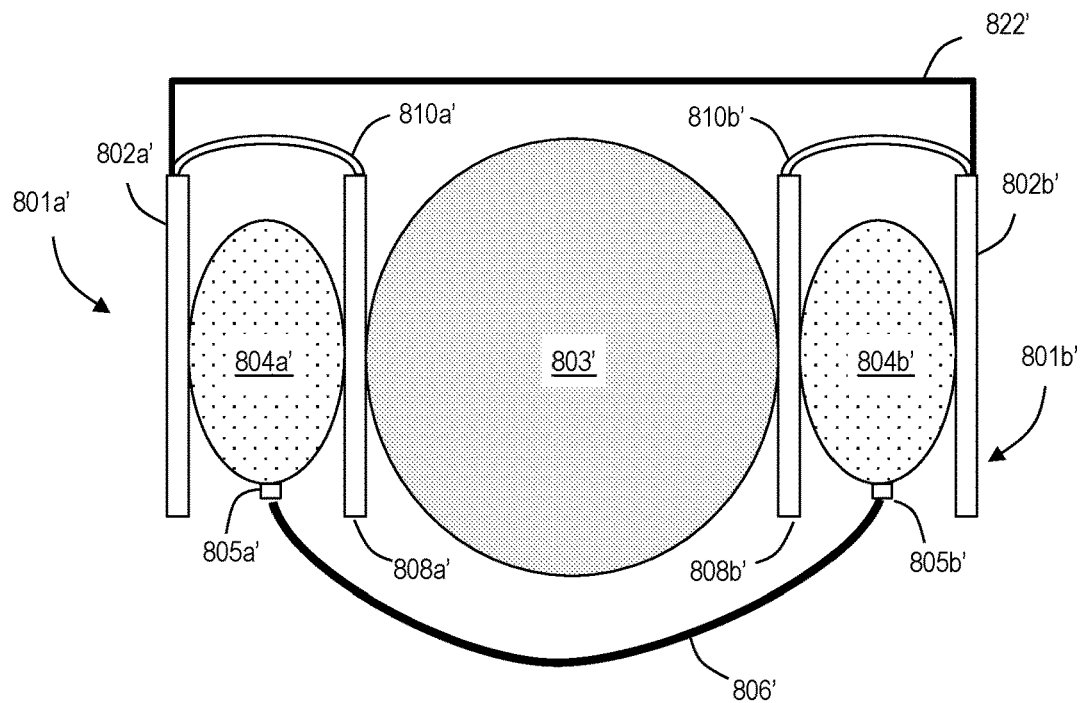
FIGS. 8A & 8B depict, respectively, schematic diagrams of an illustrative embodiment of fluid-activated impact protection system before and during a collision event.
Figure 8B:
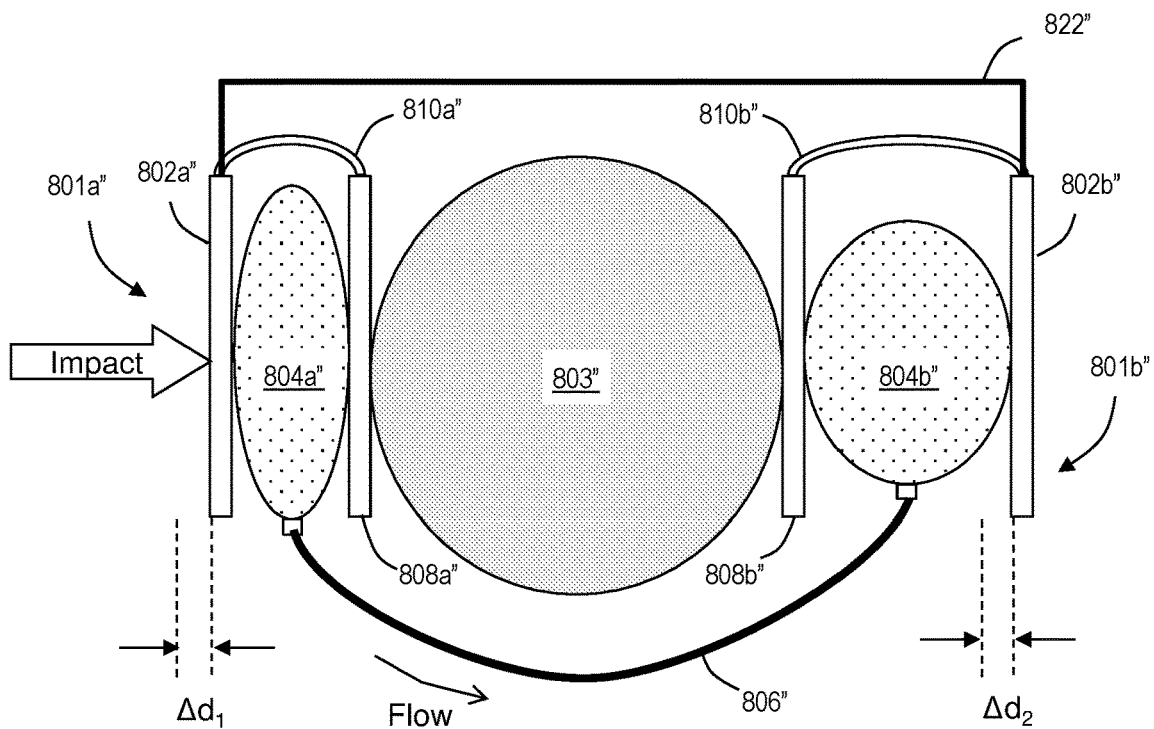

FIGS. 8A & 8B depict, respectively, schematic diagrams of an illustrative embodiment of fluid-activated impact protection system 800 before and during a collision event. The system 800 includes a first fluid module 801a including an outer shell 802a, an inner base member 808a, and an intra-module linkage 810a coupled between the outer shell 802a and the inner base member 808a. The first fluid module 801a further includes a fluid holding member 804a disposed at least partially between the outer shell 802a and the inner base member 808a. The system 800 further includes a second fluid module 801b including an outer shell 802b, an inner base member 808b, and an intra-module linkage 810b coupled between the outer shell 802b and the inner base member 808b. The second fluid module 801b further includes a fluid chamber 804b disposed at least partially between the outer shell 802b and the inner base member 808b.

A fluid hose or pipe 806 is in fluid communication between each of the first and second fluid chambers 804a, 804b by way of respective fluid ports 805a, 805b. The system 800 further includes an inter-module linkage 822 coupled between the first and second modules 801a, 801b. Although the inter-module linkage 822 is illustrated as being in communication with the outer shells 802a, 802b, it is understood that attachments can be made at one or more location, such as the intra•module linkages 810a, 810b, the inner base members 808a, 808b, the fluid capsules 804a, 804b, and the like. It is noted that in the figures, single primes are used for pre-impact configuration, whereas double primes are used for a during-impact and/or an after-impact configuration. The two modules 801a, 801b are disposed about a portion of a user's body 803. The primes are omitted in the description, unless particular reference is made to pre and/or post/during impact conditions.

In reference to FIG. 8A, the fluid capsules 804a', 804b' of the system 800' in a pre-impact state(') include respective quantities of a fluid. In reference to FIG. 8B, a collision or impact is encountered along a left portion of the system 800". The shock loading of the impact pushes against the outer shell 802a of the first module 801a. Inertia of other portions of the system 800 and/or the portion of the body 803 facilitates a compression of the first fluid capsule 804a".

The compression increases a pressure of the fluid within the first fluid capsule 804a. In at least some embodiments, the pressure increase causes at least a portion of the fluid to exit the first fluid capsule 804a" into the fluid pipe 806". At least a portion of fluid displaced from one or more of the first fluid capsule 804a" and/or the fluid pipe, which can be pre-loaded with a fluid, enter the second fluid capsule 804b". In at least some embodiments, the increase in fluid volume and/or pressure within the second fluid capsule 804b" induces a change in shape and/or configuration of the second module 801b". For example, an influx of fluid expands the fluid capsule 804b" forcing the outer shell 802b" away from the inner base member 808b". To the extent the inner base member 808b" is in communication with the portion of the body 803", this can result in an outward motion of the outer shell 802b" of the second module, away from the portion of the body 803". In at least some embodiments, this will result in a displacement of the inter-module linkage 822" between the two modules 801a", 801b". The outer shell 802a" of the first module 801a" is displaced a first distance $\Delta d_1$, whereas the outer shell 802b" of the second module 801b" is displaced a second distance $\Delta d_2$. In some embodiments, the displacement distances are substantially equal, namely, $\Delta d_1 = \Delta d_2$. Alternatively or in addition, the displacement distances can be different, $\Delta d_1 > \Delta d_2$ and/or $\Delta d_1 < \Delta d_2$.

Figure 9:
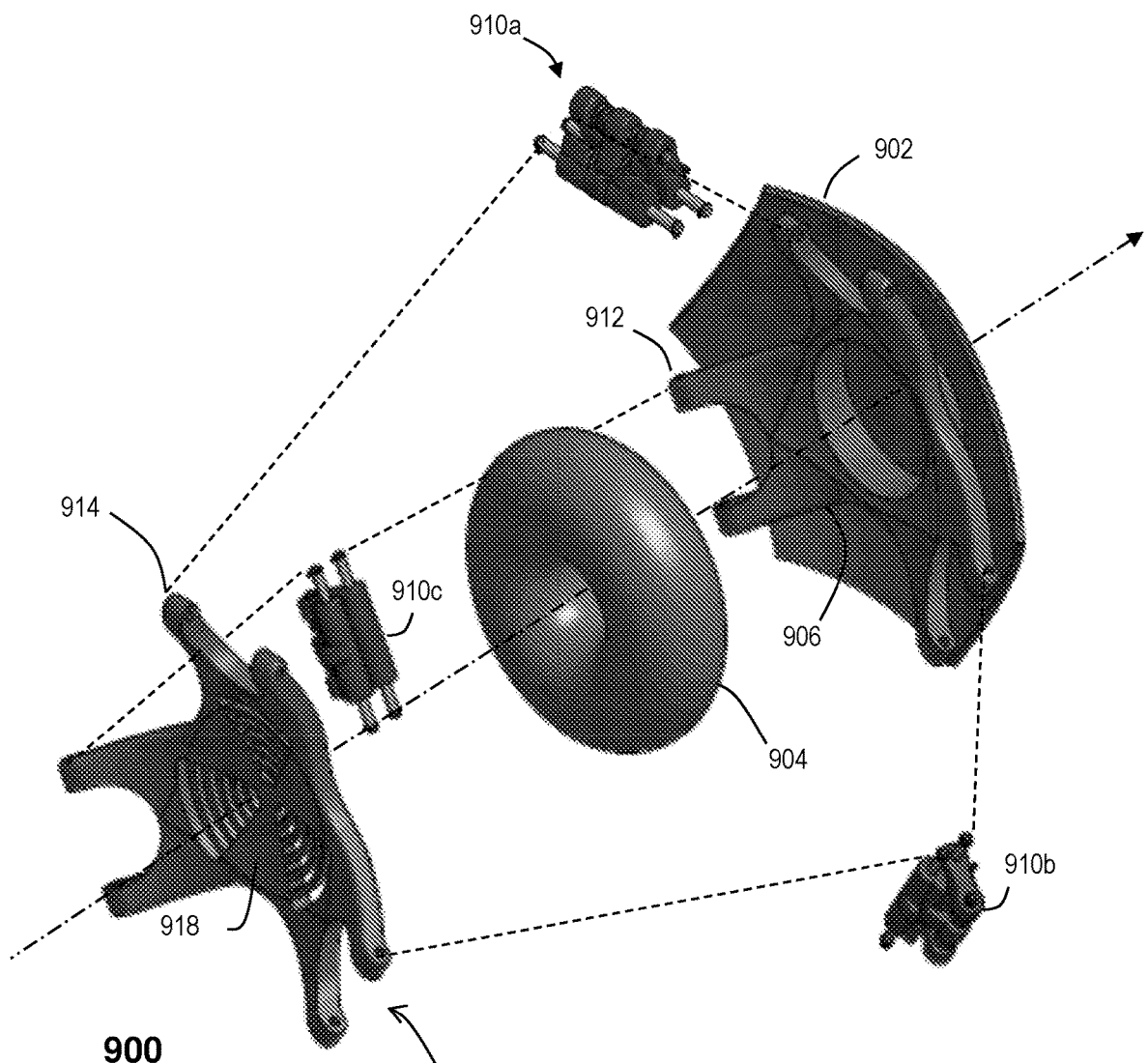
FIG. 9 depicts an exploded view of an illustrative embodiment of another fluid-activated impact protection module.

FIG. 9 depicts an exploded view of an illustrative embodiment of another fluid-actuated impact protection module 900. The example protection module 900 includes an outer shell 902, a mounting fixture 906, a fluid chamber 904, and a base member 908. The module 900 includes three intra-module linkages 910a, 910b, 910c, generally 910. Each linkage 910 is coupled between the attachment fixture 906 and the base member 908. The base member 908 includes a wall portion 918 adapted for positioning along a portion of a user's body.

Figure 10:
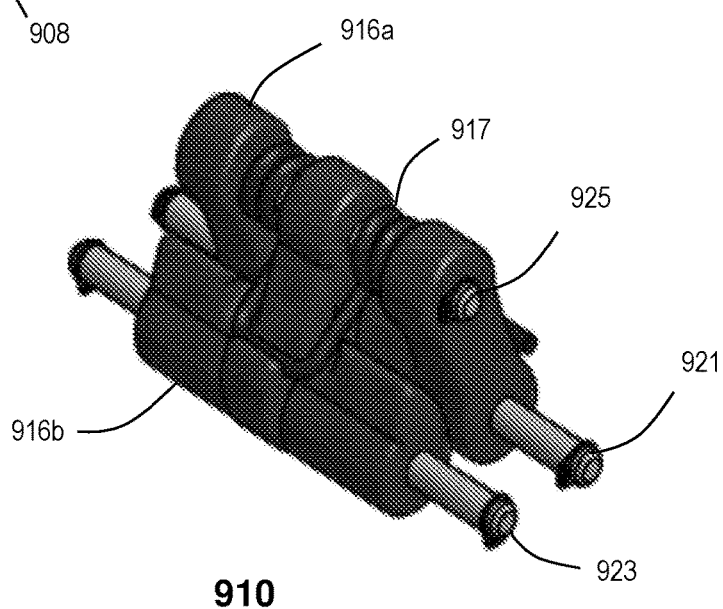
FIG. 10 depicts perspective view of an illustrative embodiment of torsion spring linkage assembly of the fluid-activated impact protection module depicted in FIG. 9.

FIG. 10 depicts perspective view of an illustrative embodiment of torsion spring linkage assembly 910 of the fluid-activated impact protection module 900 depicted in FIG. 9. The example intra-module linkages 910 includes a distal link 916a pivotally joined to a proximal link 916b along an axial pivot 925. A distal end of the distal link 916a is pivotally joined to a distal axle 921, for pivotal attachment to a mounting extension 912 of the mounting fixture 906. Likewise, a proximal end of the proximal link 916b is pivotally joined to a proximal axle 923, for pivotal attachment to a mounting extension 914 of the base member 908.

The torsion spring linkage assembly 910 includes a torsion spring 917. The example torsion spring is positioned about the axial pivot 925 and provides a spring force that tends to close the linkage assembly 910. Namely, the spring 917 applies a force that causes the distal axel 921 to approach the proximal axel 923.

In some embodiments, a mechanical linkage assembly of the torsion spring linkage 910 includes opposing linking segments 916a, 916b, generally 916, that rotate in opposition about a common pivot axis 925 in response to the impact force. The mechanical linkage assembly 910 can include a deformable, e.g., resilient, mechanism, such that a rotation of the opposing linking segments 916, e.g., in response to an impact force, deforms the resilient mechanism. In the illustrative embodiment, the resilient mechanism includes a first torsion spring 917, presenting a first spring constant in response to a compressive force that closes the mechanical linkage assembly. Alternatively or in addition, the resilient mechanism includes a second torsion spring, presenting a second spring constant in response to a decompressive force that opens the mechanical linkage assembly. One of the first torsion spring 917, the second torsion spring, or both, can include a coil spring, as illustrated. In some embodiments, the first resiliency differs from the second resiliency according to the respective spring configurations, e.g., spring constants. Still other configurations can include, without limitation, springs, tension/extension springs, compression springs, torsion springs, flat springs, serpentine springs, cantilever springs, coil springs, leaf springs, wave springs, solid materials, shaped materials, elastomers, e.g., elastomeric loops, natural materials, e.g., rubber, synthetic materials, e.g., polymers, and the like.

Figure 11:
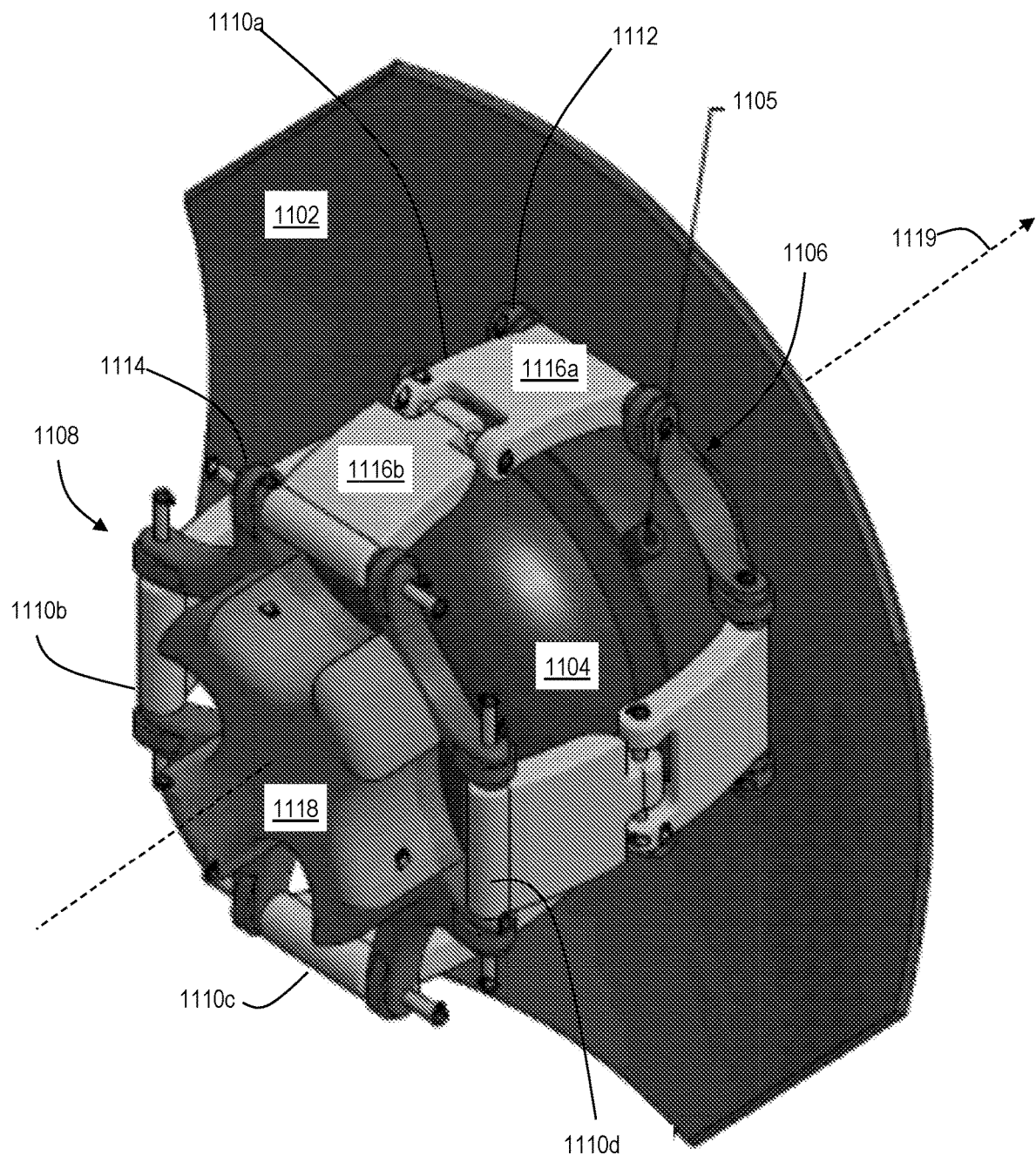
FIG. 11 depicts a perspective view of an illustrative embodiment of a fluid-displacement impact protection module.

FIG. 11 depicts a perspective view of an illustrative embodiment of a fluid-activated impact protection module 1100. The example module 1100 includes an outer structural member 1102, sometimes referred to as an outer shell, a protective structural member, a shield, a protective plate, an armor segment, a shell segment and the like. The module 1100 also includes an inner structural member 1108, sometimes referred to as a base member, a wall segment, a body support, and the like. The module 1100 further includes a fluid holding member. In some embodiments, the fluid holding member can include an enclosed cavity or chamber, sometimes referred to as a reservoir, a fluid chamber or fluid capsule. Alternatively or in addition, the fluid holding member can include a cellular structure, such as an open cell foam and/or a closed cell foam. The illustrative example includes a fluid capsule 1104 including a flexible membrane defining an interior volume adapted to retain a material, such as a fluid. In general, the fluid can include a liquid, a gas or a combination of a liquid and a gas. In some embodiments, the fluid capsule 1104 can contain one or more of a foam, a gel, or a combination of a foam and a gel alone or in combination with a fluid. In at least some embodiments, the fluid capsule 1104 is positioned substantially between the outer shell 1102 and the base member 1108. The fluid capsule 1104 is adapted to hold or otherwise contain a fluid that may or may not be under pressure, and includes at least one orifice 1105, sometimes referred to as an aperture, a vent, a fluid port, and the like, to facilitate transfer of a fluid into and/or out of the fluid capsule 1104.

In at least some embodiments, the outer shell 1102 and the base member 1108 are in movable communication with each other by way of at least one machine. The example module 1100 includes machines including four mechanical linkages 1110a, 1110b, 1110c, 1110d, generally 1110, extending between the outer shell 1102 and the base member 1108, that provide a moveable engagement between the outer shell 1102 and base member 1108. These mechanical linkages can be referred to as intra-module linkages 1110 as they link together different portions of the same module. In at least some embodiments, the fluid capsule 1104 is disposed between the outer shell 1102 and the base member 1108. In the illustrative example, the fluid capsule 1104 is at least partially enclosed, captured, or otherwise encaged between the outer shell 1102, the base member 1108 and the four mechanical linkages 1110.

In particular, the machines, linkages 1110 in the illustrative example, facilitate a controlled movement between the outer shell 1102 and the base member 1108. In some applications, an external force, as might be experienced during an impact event, is applied to the outer shell 1102. The impact force can initiate actuation of the machine, e.g., the linkages.

Continuing with the illustrative embodiment, the external impact force collapses a volume defined between the outer shell 1102 and the base member 1108. The collapsing volume compresses the fluid capsule 1104. Beneficially, the fluid chamber 1104 is compressed in a controlled manner, e.g., substantially evenly, between the collapsing parallel surfaces of the outer shell 1102 and the base member 1108. To the extent a fluid within the fluid capsule 1104 is compressed, at least a portion of a kinetic energy of the impact can be stored as potential energy of the compressed fluid and another portion can be dissipated, depending on the amount of damping present in the system.

In at least some embodiments, at least a portion of a fluid stored within the fluid capsule 1104 is expelled through the fluid port 1105. The expulsion of the fluid can transform at least a portion of the kinetic energy of the impact into a kinetic energy of the fluid. The fluid can be expelled into the atmosphere and/or into a fluid link, e.g., a pipe, to be diverted to a predetermined location. In at least some embodiments, the fluid link is coupled to a fluid port of another fluid-activated module. The other fluid-activated module can be the same, similar or different from the example module 1100.

Continuing with the illustrative example, a portion of the fluid expelled from the fluid capsule 1104 of the first module 1100 subject to the impact flows into the fluid capsule of the other module. The influx of fluid can increase a pressure within the other fluid capsule, thereby allowing at least a portion of the kinetic energy of the collision to be stored as potential energy of the compressed fluid of the other fluid capsule. In at least some instances, the influx of fluid causes an expansion of the other fluid capsule. The expansion of the capsule disposed between the outer shell and the base member of the other module, in turn, facilitates a controlled movement between the outer shell and the base member. For example, the outer shell is driven away from the base member by the expansion and/or increased pressure of the fluid capsule.

Each linkage 1110 includes a pair of pivotally joined linking members or links: a distal linking member or link 1116a and a proximal linking member or link 1116b, generally 1116. It is understood that a greater or fewer number of mechanical linkages 1110 are possible. Likewise, each mechanical linkage 1110 can include a greater or fewer number of individual links, e.g., one or more linking members 1116. The linking members 1116 of a particular mechanical linkage 1110 can be of equal lengths and/or different lengths. In some applications, the mechanical linkages 1110 are substantially identical, e.g., each having two pivotally joined linking members 1116, as show. It is understood that in some embodiments at least some of the mechanical linkages 1110 of the module 1100 can differ, e.g., without limitation, having different lengths, different numbers of linking members 1116 of equal and/or different lengths. Likewise, the linking members 1116 can be formed from rigid materials, such as metals, thermosets, thermoplastics, ceramics, composites, e.g., resin based composites with fiber matrices, and the like. Alternatively or in addition, the linking members 1116 can be formed from flexible materials, such as plastics, rubbers, fiber-based structures, elastomers, and the like.

In more detail, the module 1100 includes a mounting fixture 1106 fixedly positioned with respect to the outer shell 1102. The mounting fixture 1106 includes distal attachment members 1112, in the example embodiment, four such distal attachment members are pivotal attachment members 1112, to which distal ends of a mechanical linkages 1110 are pivotally attached. In the illustrative embodiment, each of the pivot attachment members 1112 includes a single axle, or a pair of axially aligned pivots adapted to engage one or more apertures or pivotal mounts in the distal linking member 1116a. Other types of pivotal attachment members are contemplated, such as apertures or slots that pivotally engage an axial or axial extension of the mechanical linkages 1110. More generally, any of the pivot joints disclosed herein can include one or more of a hinge joint, a ball-and-socket joint, a condyloid joint, a saddle joint, and the like.

Likewise, the base member 1108 can include proximal attachment members, such as pivotal attachment members 1114. In the example embodiment, the base member 1108 includes four proximal pivotal attachment members 1114, to which proximal ends of the mechanical linkages 1110 are pivotally attached. In the illustrative embodiment, each of the pivotal attachment members 1114 includes a single axle, or a pair of axially aligned pivots adapted to engage one or more apertures or pivotal mounts in the proximal linking member 1116b. Other types of pivotal attachment members are contemplated, such as apertures or slots that pivotally engage an axial or axial extension of the mechanical linkage 1110. Other pivotal attachment members can include, without limitation, ball-and-socket type pivots. Proximal attachment members 1114 can be similar or different from distal attachment members 1112. Likewise, attachment members of different mechanical linkages 1110 of the same module 1100 can be the same or different.

Without limitation, the mounting fixture 1106 can include a separate module or assembly that attaches to an inner surface of the outer shell 1102. The attachment to the outer shell can be a fixed attachment, e.g., including one or more of a glue, a bond, a weld, a snap fit, a fastener, such as a pin, a rivet, a staple, a screw, a stitch, and the like. In at least some embodiments, the mounting fixture 1106 is integrally formed with the outer shell 1102, e.g., by one or more of injection molding, casting, 3-D printing, machining, and the like.

The base member 1108 can include a body-facing surface 1118, such as an outward facing wall segment. The wall segment 1118 can be configured to abut an adjacent portion of a body. For example, the wall segment 1118 can be flat and/or can include a curved and/or faceted shape or contour. Such shapes or contours can be based at least in part on a shape of an adjacent portion of the body. Thus, when configured for use to protect a user's head and/or joint, the wall segment 1118 may contain one or more curved surfaces sized and shaped according to the head or joint. The curves can be based on curves of the adjacent portion of the body, such that a substantial portion of the wall segment 1118 is in communication with the adjacent portion of the body during a collision event.

In some embodiments, the wall segment 1118 is rigid. Alternatively or in addition, the wall segment 1118 can be semi-rigid and or deformable or flexible. Physical properties of the wall segment 1118 can change under blunt force load and or impact load conditions. For example, the wall segment 1118 can be relatively soft during periods of normal use, but present rigid or at least semi-rigid characteristics during a collision event. The wall segment 1118 can be formed from one or more of the various materials disclosed herein, such as polymers, rubbers, ceramics, metals, composites, gels, and the like. In at least some embodiments, the wall segment 1118 includes one or more deformable members, such as resilient pads or similar features to provide comfort to the adjacent portion of the user's body 1104 during use. It is understood that, without limitation, pads can include compressible elements, compressible materials including resilient materials, such as foams, springs and the like to facilitate comfort during static use and/or shock abatement during periods of dynamic use, e.g., during a collision event.

Depending upon a direction, size, shape and/or point of contact, the collision actuates the module 1100 resulting in a controlled movement of the outer shell 1102 and the inner structural member 1108. The controlled movement between the outer shell 1102 and the inner structural member 1108 results in a pressure differential within a fluid contained within the fluid capsule 1104. The pressure differential, in turn, induces a transfer of at least a portion of the fluid into and/or out of the fluid capsule 1104, e.g., through the one or more orifices 1105.

The controlled movement can include one or more of a compression, an expansion, a shear displacement, and a rotation. By way of example, a compression can include at least some portions of the outer shell 1102 and the inner structural member 1108 moving towards each other. An expansion can include at least some portions of the outer shell 1102 and the base member 1108 moving away from each other. A shear displacement can include at least some portions of the outer shell 1102 and the inner structural member 1108 moving laterally with respect to each other, e.g., in a sliding arrangement. Rotations or twists can include rotations substantially about a reference line extending between the outer shell 1102 and the inner structural member 1108, e.g., a normal line. Alternatively or in addition, rotations or twists can include relative rotational displacements in a reference plane bisecting the module along an axis 1119.

Figure 12:
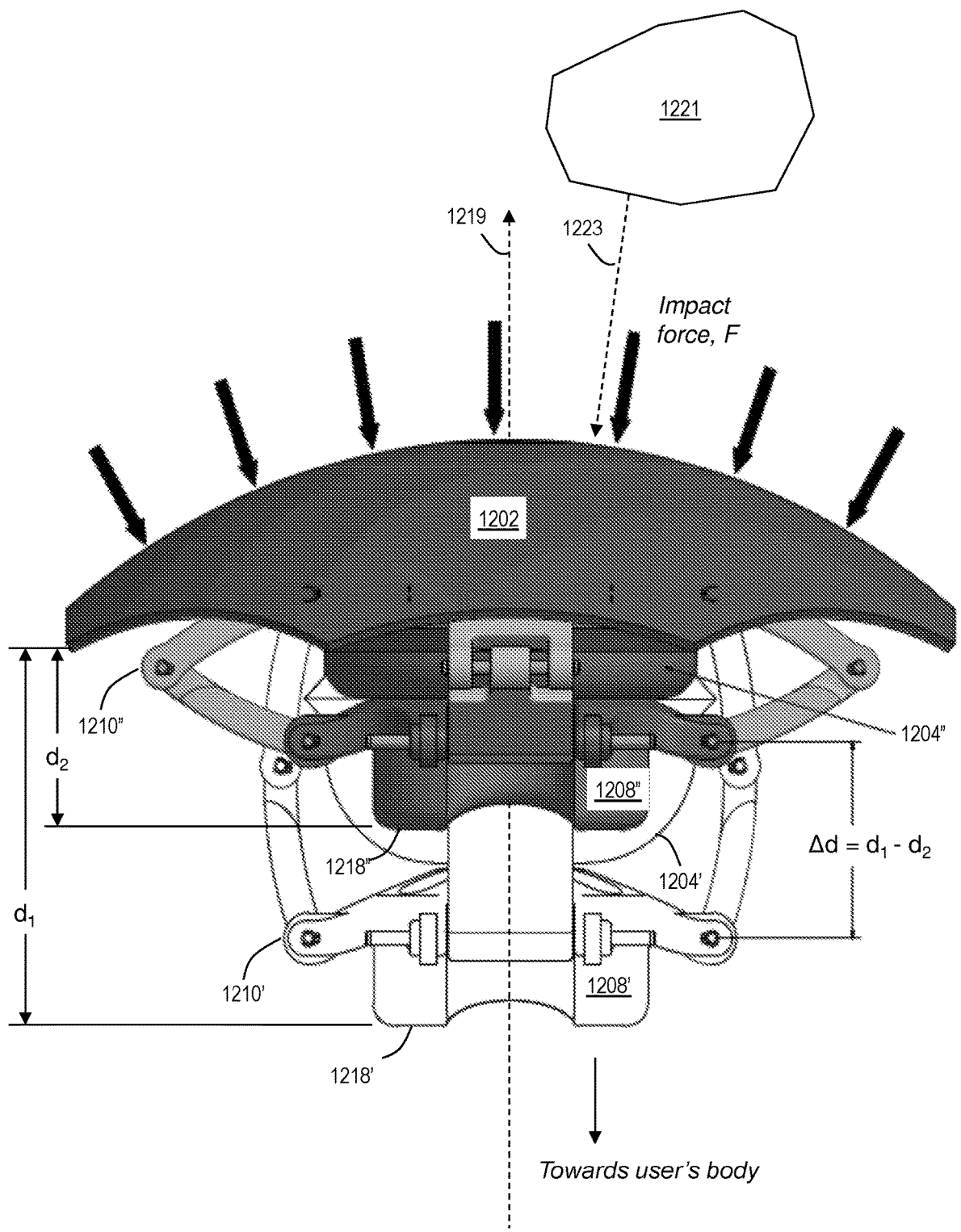
FIG. 12 depicts a side view of an illustrative embodiment of a fluid-displacement impact protection module.

FIG. 12 depicts a side view of an illustrative embodiment of a fluid-activated impact protection module 1200 in a dynamic response mode or configuration. Namely, the module 1200 when placed against a portion of user's body (not shown) is subjected to an external force, F, shown for illustrative purposes as normally incident upon an outer shell 1202. The external force F, e.g., resulting from a collision of the module 1200 with another object 1221, is applied to an exterior surface of the outer shell 1202 as shown. The force F pushes the module 1200 downward with respect to the user's body portion. Mechanical linkages 121 O', depicted in a pre-collision configuration, are pivotally attached between the outer shell 1202 and an inner structural or base member 1208'. A fluid capsule 1204' is disposed between the outer shell 1202 and the base member 1208'. A first reference distance d1 is drawn between a reference point of the outer shell 1202 and a base member inner surface 1218'.

The mechanical linkages 121 O" are also depicted in an impact configuration corresponding to a collision event, wherein the module 1200 is subjected to the impact force, F. Consequently, the mechanical linkages 1210" during the collision event are shown in a substantially collapsed configuration. A second reference distance d2 is drawing between the same reference point of the outer shell 1202 and the inner surface of the base member 1218". As the impact tends to compress the module 1200 against the user's body, the pre-collision distance di is greater than the distance di during the collision event.

A fluid capsule 1204' is disposed between the outer shell 1202 and the base member 1208'. According to the illustrative example, the fluid capsule 1204" is compressed between the outer shell 1202 and the base member 1208" during shock loading or blunt force impact of a collision event. To the extent that the fluid capsule 1204' contains a fluid, at least a portion of the fluid can be expelled from the fluid capsule 1204', e.g., via a fluid port 1105 (FIG. 11), as the fluid capsule 1204" is compressed during the collision event.

Accordingly, the linkages 1210 allow for a controlled movement of the outer shell 1202 and the base member before 1208' and during 1208" the collision event. At least a portion of the controlled movement can occur along an axis 1219, such that the fluid capsule is compressed between the members 1202, 1208". It is understood that various design parameters can be selected to contribute to a response of the module 1200 to the impact force F. Without limitation, such design parameters include material properties of one or more of the shell portion 1202 and the base portion 1208'. Likewise, a size and/or shape of the fluid capsule 1204', a size, shape and/or number of fluid ports 1105 (FIG. 11), and/or a quantity of a fluid within the fluid capsule 1204' may also contribute to the response of the module 1200.

In at least some embodiments, a portion of the impact force and/or kinetic energy of the impact that would otherwise be transferred toward the user's body is expended, absorbed, and/or otherwise reduced. This expenditure can include one or more of absorbing and/or dissipating energy associated with the impact. The absorbing and/or dissipating energy can occur, at least in part, along a direction other than the line of action. Alternatively or in addition, a reduction of at least a portion of the impact force can include an elastic and/or plastic behavior of materials to transform at least a portion of impact kinetic energy. Namely, impact energy can be absorbed by a break or fracture, a dent, a deformation or other temporary and/or permanent alteration of a protective system component, such as the outer shell 1202, the base member 1208, the fluid capsule 1204, the mechanical linkages 1210, and the like.

In some embodiments, operation of the mechanical linkage 1210 can occur within a plane. Consider a hinge-type pivot in which rotation is substantially constrained to a plane substantially perpendicular to an axis of the pivot. Alternatively or in addition, rotation can occur more freely, e.g., within three dimensions. Consider a point fulcrum in which a linking member 1116 of the mechanical linkage 1210 can rotate in three dimensions. By way of non-limiting arrangements, a pivot can include a ball-and-socket style joint or coupling. Such an engagement can include a partially spherical protrusion, e.g., a ball or a partially spherical cavity, e.g., a socket positioned at a pivot location along the mechanical linkage and a corresponding socket or ball positioned at an adjacent fulcrum. The ball-and-socket joint generally allows for multidirectional movement and rotation.

Although the illustrative examples include transformations of a kinetic energy associated with an impact into a potential energy, e.g., by changing a pressure applied to a fluid contained within the fluid capsule 1204, it is understood that other energy absorbing and/or dissipating techniques can be used. For example, energy of an impact force can include transforming a kinetic energy to one of a potential energy, a mechanical energy, a thermal energy, an acoustic energy, an electrical energy, a magnetic energy, or any combination thereof. Energy can be stored in deformations of mechanical components and/or locations and/or pressures of fluids.

Figure 13:
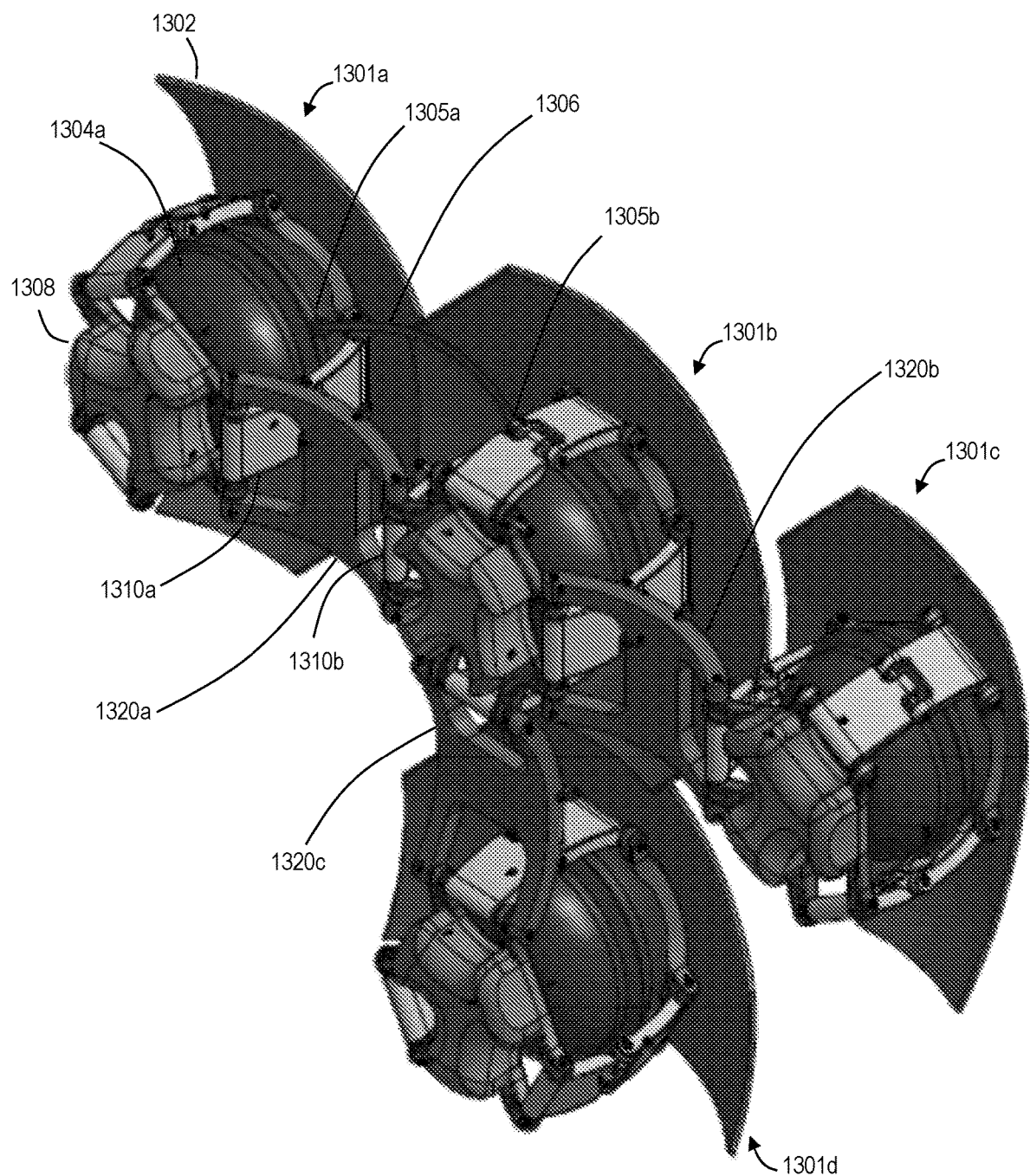
FIG. 13 depicts a perspective view of an illustrative embodiment of a modular impact protection system.

FIG. 13 depicts a perspective view of an illustrative embodiment of a modular impact protection system 1300. The system 1300 includes multiple impact protection modules 1301a, 1301b, 1301c, 1301d, generally 1301. At least some of the impact protection modules 1301 include a fluid chamber 1304 positioned between an outer shell 1302 and a base member 1308. A fluid channel, such as a fluid pipe or hose 1306 is coupled between a first fluid port 1305a of one fluid chamber 1304 to a second fluid port 1305b of another fluid chamber.

At least some of the impact protection modules 1301 are cross linked. According to the illustrative example, inter-module linkages 1320a, 1320b, 1320c, generally 1320, join different impact modules 1301 together. A first inter-module linkage 1320a movably joins the first and second impact protection modules 1301a, 1301b together. Likewise, a second inter-module linkage 1320b movably joins the second and third impact protection modules 1301b, 1301c. Similarly, a third inter•module linkage 1320c movably joins the third and fourth impact protection modules 1301b, 1301d. Some impact protection modules 1301a, 1301c, 1301d include single inter-module linkages 1320a, 1320b, 1320c, whereas, other impact protection modules 1301b include multiple inter-module linkages 1320a, 1320b, 1320c.

According to the illustrative modular system 1300, the inter-module linkages 1320 each include a single linking member pivotally attached between two adjacent modules 1301. In more detail, the inter-module linkages 1320 are pivotally joined to base members 1308 of adjacent modules 1301. Such interconnection along the body-facing sides of the modules 1301 joins the modules 1301 together, while allowing the outer shells 1302 to operate freely and independently.

It is understood that the inter-module linkages 1320 can include any of the various types of linkages disclosed herein, including, without limitation, multi-link linkages having rigid links and/or flexible links, axial pivots, ball and socket pivots, springs, elastic components, inelastic components, gears, screws, levers, fabrics, wires, chains, ropes, strings, loops, straps, and the like. It is further understood that in some embodiments all of the inter-module linkages 1320 are substantially the same, whereas, in other embodiments, at least some of the inter-module linkages 1320 are different.

More generally, one or more of the intra module linkages, the inter-module linkages, individual links of the linkages, the outer shell and/or the base member can provide different material properties. For example, some linkages can be substantially rigid, whereas, others can be flexible. Alternatively or in addition, one or more structural members, such as the linkages, links, outer shells or base members can provide different material properties within the same structural member. For example, a first portion of an individual link extending between the first and second ends can be substantially rigid, whereas, a second portion of the same link can be substantially flexible.

It is further understood that one or more of the structural members can be formed as a unitary member, e.g., according to one or more of molding, casting and/or machining processes. Alternatively or in addition, one or more of the structural member can be formed as an assembly, in which one or more elements of the structural member, e.g., a shell portion, proximal attachments, the pivot extensions, and the like can be formed as an assembly. The assembly can include the use of one or more mechanical fasteners, chemical fasteners, thermal or welding techniques, and combinations thereof. Mechanical fasteners can include, without limitation, screws, nails, staples, snap fit engagements, and the like.

Although the inter-module linkages 1320 are shown as interlinking adjacent modules 1301, it is understood that linking can be accomplished according to other configurations. For example, non-adjacent modules 1301 may be linked together. Alternatively or in addition, some modules 1301 may be interlinked with all adjacent modules 1301, whereas, other modules 1301 may include links to some adjacent modules 1301 without including links to other adjacent modules 1301.

In some embodiments, the inter-module linkages 1320 attach to common regions or attachment points between modules. Such common points include, without limitation, between base members 1308 of different modules, between intra-module linkages of different modules, and/or between outer shells 1302 of different modules. Alternatively or in addition, the inter-module linkages 1320 can attach to different regions or attachment points between different modules 1301. For example, one inter-module linkage 1320 can attach to a base member 1308 of one module, while attaching to an intra-module linkage of another, e.g., along one of the links or at a pivot location between links of the intra-module linkage. Likewise, one inter-module linkage 1320 can attach to a base member 1308 and/or an intra-module linkage of one module 1301, while attaching to an outer shell 1302 of another module 1301.

It is envisioned that in at least some embodiments, the modular system 1300 can conform to a portion of a user's body. For example, individual modules 1301 are joined by movable inter-module linkages to allow the individual modules 1301 to be positioned in contact with adjacent minor regions of the user's body, e.g., those regions covered by the respective outer shells 1302. The movable inter-module linkages allow the modules 1301 to follow a body contour, e.g., a head, a torso or a limb to provide extended protection over a greater region than covered by any single module 1301. Illustrative examples of a modular helmet system and a modular torso system are provided below for reference.

In at least some embodiments, a single inter-module linkage 1320 can be coupled to more than two modules 1301. The coupled modules 1301 can include adjacent modules 1301, non-adjacent modules 1301, or combinations thereof. In at least some embodiments, a single inter-module linkage 1320 links together substantially all or all of the individual modules 1301 of the modular system 1300. For example, a common inter-module linkage 1320 can include a strap, a chain, a rope, a net, a mesh and the like, whereby each of the modules are attached to the common inter-module linkage 1320. Spacing between adjacent modules 1301 can be controlled according to placement and/or attachment of the modules to the common inter-module linkage 1320. In at least some embodiments, the common inter-module linkage 1320 includes a fitted substrate, such as a garment, e.g., a hood, a cap, a sleeve, a vest, a jacket, trousers, and the like.

Individual modules 1301 can be fixedly attached directly to the common inter-module linkage 1320. Alternatively or in addition, the modules can be removably attached to the common inter-module linkage 1320. For example, the inter-module linkage 1320 can include one or more pockets adapted to retain at least a portion of a module 1301. Placement of the modules 1301 along the common inter•module linkage 1320 can be controlled according to placement of the individual pockets. It is understood that such removable attachments can offer flexibility allowing a particular configuration of individual modules 1301 to be set, adapted and/or modified by the user.

In some embodiments, the modular system 1300 can be assembled as a self-contained, wearable unit. In the illustrative example, the modular system 1300 can be assembled into a free-standing assembly that can be worn with or without a separate protective shell. It should be understood that the shock abatement systems disclosed herein can be assembled into free-standing assemblies and used without protective shells. Such free-standing assemblies can be pre-assembled and inserted into or otherwise combined with protective shells. Alternatively or in addition the shock abatement systems can be combined with one or more protective shells and/or assembled in combination with such shells. In some embodiments, one or more components, e.g., the pivotal attachments, can be attached to and/or integrally formed with the protective shell. It is envisioned that in at least some embodiments, the shell can include one or more cantilevered segments. For example, a cantilevered segment can include a hinged shell segment, e.g., attached along one region or edge and defined by a void, a gap or a channel along other regions, as may be formed by removing material from a portion of a shell.

Figure 14A:
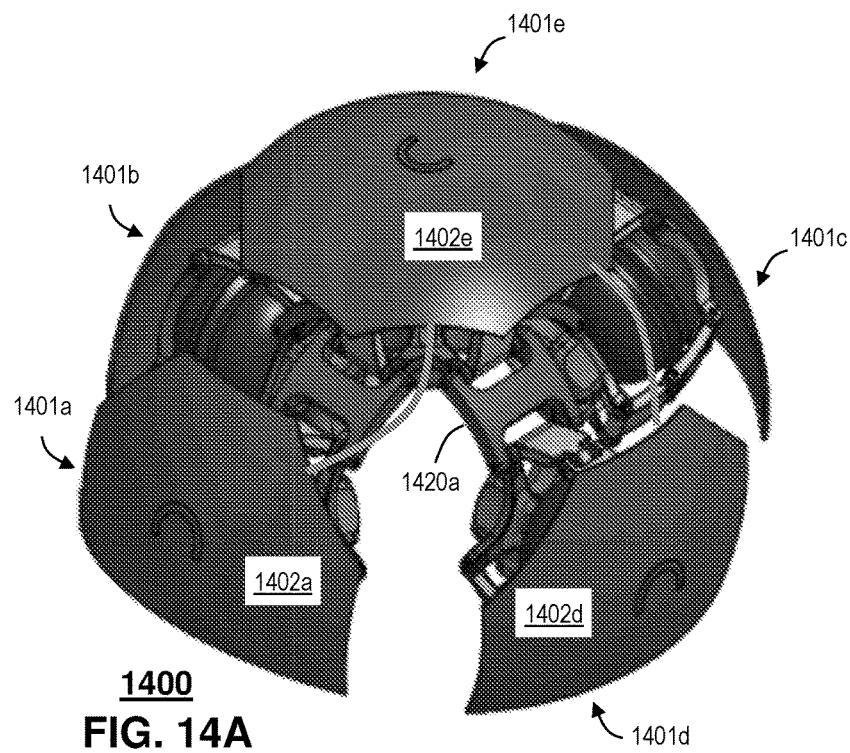
FIGS. 14A & 14B depict, respectively, top-perspective and bottom views of an illustrative embodiment of a modular impact protection helmet.
Figure 14B:
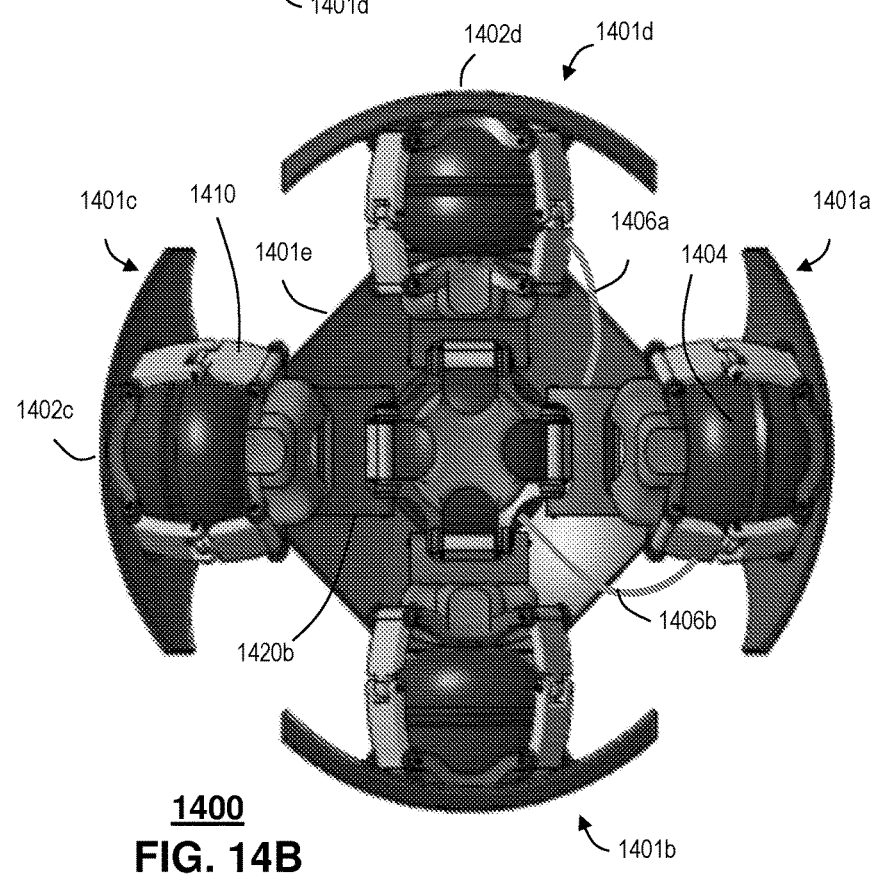

FIGS. 14A & 14B depict, respectively, top-perspective and bottom views of an illustrative embodiment of a modular impact protection helmet assembly 1400. The example helmet assembly 1400 includes five fluid actuated protection modules 1401a, 1401b, 1410c, 1401d, 1401e, generally 1401. Each of the individual modules can be similar to any of the various modules disclosed herein. In more detail, a first module 1401a is a frontal module positioned along a front portion, e.g., forehead, of a user's head, when worn. A second module 1401*c* is an occipital module positioned along a rear portion of the user's head and/or neck, when worn. Third and fourth modules 1401*b*, 1401*d* are side or temporal modules positioned along a side or temple portion of the user's head, when worn. A fifth module 1401*e* is a crown module positioned along a crown portion of the user's head, when worn. The helmet assembly 1400 further includes or more fluid hoses or pipes 1406*a*, 1406*b* interconnected between one or more of the fluid chambers.

It is understood that in some embodiments the different modules 1401 of the same helmet assembly 1400 can be identical in form and function. Alternatively or in addition, at least some of the modules can differ in one or more of form and/or function. In the illustrative embodiment, the inner workings of the modules are substantially identical. Namely, each module includes a respective shell portion, a base portion, a machine and a fluid chamber. However, the form of the modules 1401 of the example embodiment does differ according to their position with respect to the user's head. For example, the outer shells are somewhat trapezoidal in shape, whereas the crown shell is octagonal.

The helmet assembly 1400 further includes inter-module linkages 1420*a*, 1420*b*, generally 1420. The linkages 1420 are similar to the linkages 1320 of the modular system 1300 (FIG. 13). Namely, the linkages 1320 are moveably, e.g., pivotally, joined between base members of adjacent modules. In particular, the crown module 1401*e* is pivotally joined to each of the front, rear and side or lateral modules 1401*a*, 1401*b*, 1401*c*, 1401*d*. In more detail none of the front, rear and/or side or lateral modules 1401*a*, 1401*b*, 1401*c*, 1401*d* are joined to each other. Rather, the front, rear and/or side or lateral modules 1401*a*, 1401*b*, 1401*c*, 1401*d* are only pivotally joined to the crown module.

It is understood that in some embodiments, the inter-module linkages 1420 can have other configurations. For example, at least some of the front, rear and/or side or lateral modules 1401*a*, 1401*b*, 1401*c*, 1401*d* can be joined to each other.

The helmet system 1400, when positioned on a portion of a body, facilitates a redistribution of an impact force transferred to the body via the modules 1401. In particular, the helmet system 1400 includes a segmented protective shell formed from multiple shell segments 1402*a*, 1402*b*, 1402*c*, 1402*d*, 1402*e*, generally 1402, that are movable with respect to each other. The shell segments 1402 are operatively coupled to machine intra-module linkages 1410. One or more fluid capsules 1404 in contact with the outer shell and or intra module linkages 1401 deform due to the controlled movement, displacement, expansion, contraction, and the like, of the individual modules 1401. In some embodiments, the helmet assembly 1400 includes the protective shell, e.g., being formed from outer shell 1402 components of the various modules 1401.

The shell segments 1402 can be planar, and or contoured, e.g., portions of an ellipsoid, a spheroid, and the like. In some embodiments, at least some of the shapes are identical, or similar, e.g., regular and/or irregular polygons, such as the example octagon shapes. It is understood that perimeters of adjacent shell segments 1402 can be shaped, sized and/or otherwise configured to provide a predetermined gap width therebetween. The gap width can be controlled to be as narrow as possible to still allow for relative movement between adjacent shell segments 1402 during use. Alternatively or in addition, at least some of the gaps can be large and/or irregular, e.g., to reduce and/or otherwise minimize coverage area, allow for ventilation, reduce weight, reduce cost, and the like.

By way of illustration, a lateral force applied to a left side of a helmet compresses one or more fluid capsules 1404 along a left side of the user's head, e.g., collapsing the fluid capsules 1404 and compressing the intra-module linkages, causing one or more other fluid capsule, intra-module linkages and/or inter-module linkages to store potential energy along other regions of the user's head. Relative movement between the user's head and the helmet assembly 1400 results in fluid capsule(s) 1404, intra-module linkages 1410, and/or inter-module linkages 1420 along an opposing, right side of the user's head to reduce compression of the fluid capsule's 1404 along a right side of the user's head, e.g., opening the intra-module linkages 1410, allowing the fluid capsule 1404 to release potential energy along the right side of the user's head. The potential energy released by the fluid capsules 1404 and/or linkages 1410, 1420 along a side of the user's head that is opposite to the impact location, acts to apply an inward force to the opposite side of the user's head. Accordingly, an impact force along a first direction results in a first reaction force applied along the same direction as well as a second reactive force acting in a different direction. Application of any of the reaction forces over respective distances results in respective performances of work.

It is understood that a segmented shell can be used alone or in combination with any of the various mechanism, frames, helmets, machines, e.g., mechanical linkages, fluid chambers, fluid pipes, deformable members, shock abatement systems and the like disclosed herein. For example, the helmet assembly 1400 can include a machine having one or more of a mechanical linkages, a lever, an inclined plane, a wedge, a pulley, a gear, a screw, and the like. In some embodiments, one or more of the modules 1401 are attached to the machine, and/or to another support structure of a system that includes the machine. In modular systems, fluid actuated impact protection modules can incorporate throttling in at least one module. Throttling can be accomplished by deforming an outlet port and or a fluid hose 1406.

Figure 15:
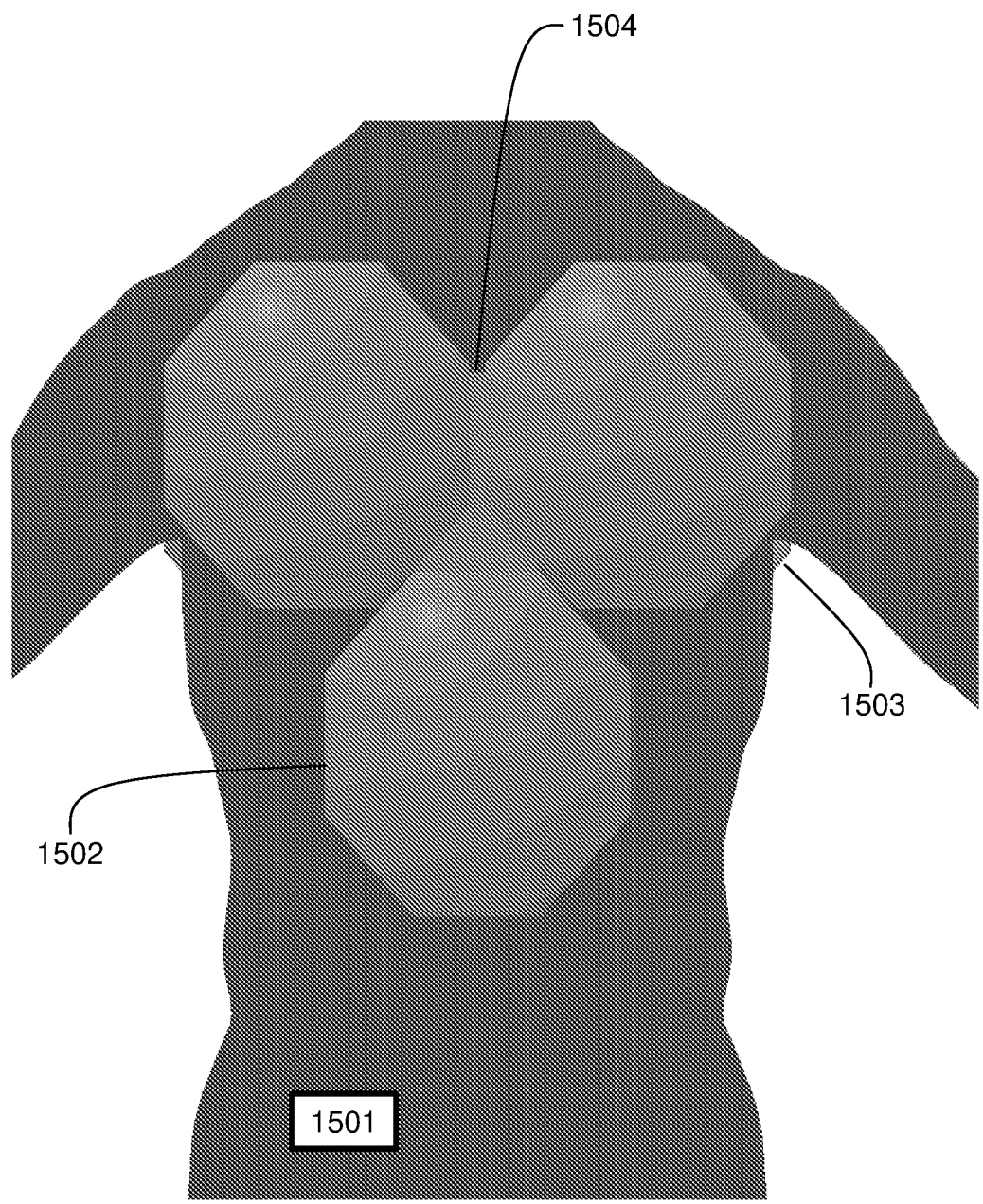
FIG. 15 depicts front view of an illustrative embodiment of a modular impact protection system used as body armor.

FIG. 15 depicts a front view of another embodiment of the planar configuration of the impact protection modules 1300 shown in FIG. 13. The impact protection modules are used as body armor to protect specific areas of the body 1501. Chest protection 1502 can be independent and or interconnected to the array of modules that protect the back 1503 of the user 1501. At least one inter-module linkage 1503 connects the independent modules. Impact protection modules are of the various types discussed.

In some embodiments, none of the modules 1502, 1503 are mechanically linked to any other modules. In other embodiments, at least some of the modules are mechanically linked together. For example, two or more of the anterior modules 1502 can be mechanically interlinked, e.g., using one or more inter-module linkages 1320 (FIG. 13). Alternatively or in addition, two or more of the posterior modules 1503 can be mechanically interlinked, e.g., using one or more inter-module linkages 1320. In at least some embodiments one or more of the anterior modules 1502 can be interlinked to one or more of the posterior modules 1503.

One or more of the modules 1502, 1503 can be in fluid communication with one or more of the other modules 1502, 1503, such that a compression and/or expansion of one of the modules 1502, 1503 causes an expansions and/or contraction of another one of the modules 1502, 1503. In at least some embodiments, all of the modules 1502, 1503 are in fluid communication with each other, such that an expansion and/or contraction of some of the modules 1502, 1503 causes a contraction and/or expansion of some other of the modules 1502, 1503. By way of illustrative example, a blunt force or impact to the chest portion of the torso 1502 can compress at least the chest modules 1502. The compression can displace a fluid that can cause an expansion of other modules, such as the posterior modules 1503. In this manner an impact at one body location can apply force and/or perform work at another body location.

Figure 16A:
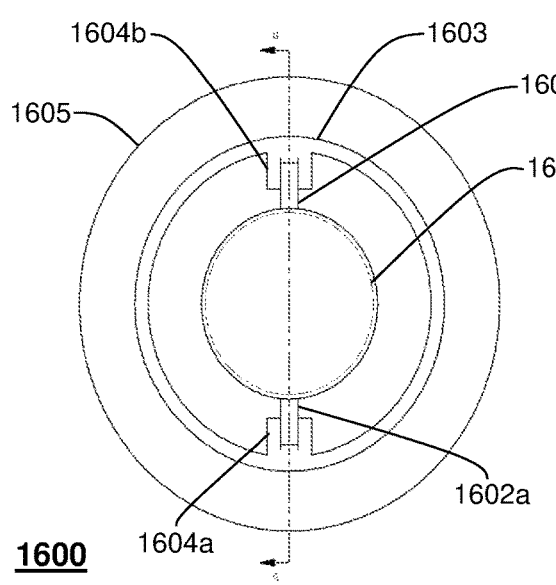
FIGS. 16A & 16B depict top and section views of another illustrative embodiment of a fluid-displacement impact protection module.

FIG. 16A shows a top view of another embodiment of a fluid actuated impact protection module. Module 1600 incorporates an outer structural member 1601 operatively coupled to levers 1602a, 1602b, generally 1602. Outer structural member 1601 is threaded for usage in different applications, such as body armor. Different methods for incorporating member 1601 can be used, as snap fits or adhesives. Levers 1602 rotate around base member pivots 1604a, 1604b, generally 1604. Base member 1603 is shown as a cylindrical member with two pivot locations 1604 for illustrative purposes, other configurations are possible. A fluid holding member 1605 is placed under base member 1603.

Figure 16B:
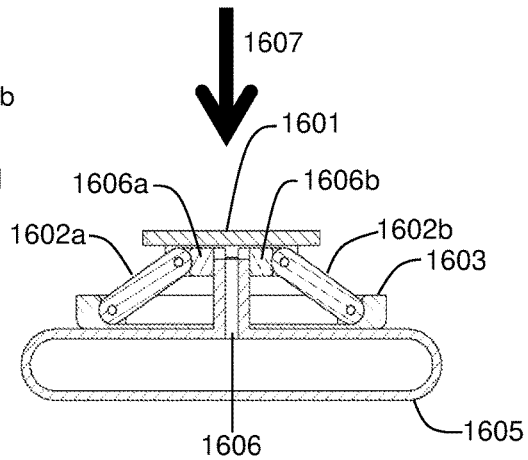

FIG. 16B shows section view G-G of impact protection module 1600 shown in FIG. 16A. Fluid holding member 1605 incorporates an elongated outer port 1606 which is accommodated between ends 1606a, 1606b, generally 1606 of levers 1602.

During an impact event, a force, indicated by arrow 1607, causes the outer structural member to translate. The movement of the outer structural member is controlled by levers 1602; a translation in the direction indicated by the arrow causes the levers to rotate inwards.

Figure 16C:
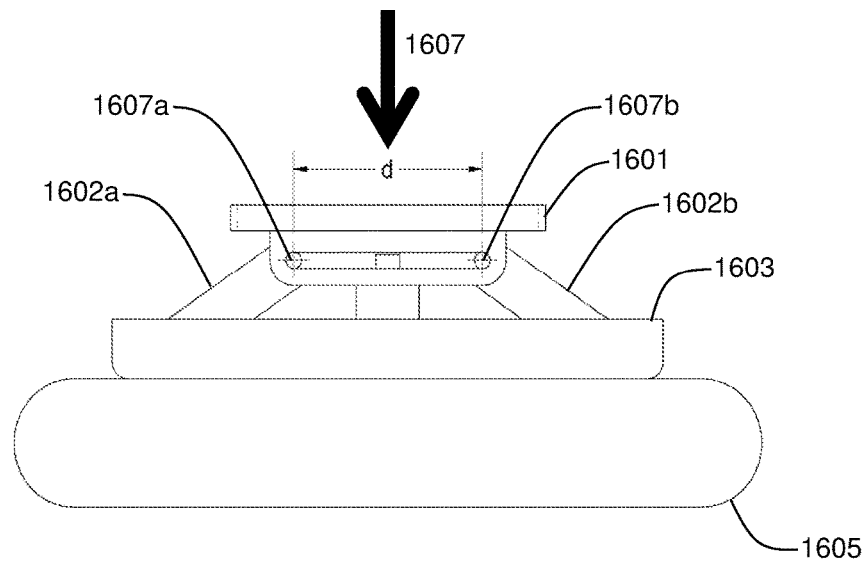
FIG. 16C depicts a front view of another illustrative embodiment of a fluid-displacement impact protection module.

FIG. 16C depicts a front view of the fluid-displacement impact protection module 1600. Lever inward rotation due to impact force 1607 reduces distance "d", reducing the gap between lever ends 1606, thus deforming the outlet port 1606 of fluid holding member 1605. Fluid flow from the fluid holding member is throttled, thus damping the impact.

Figure 17A:
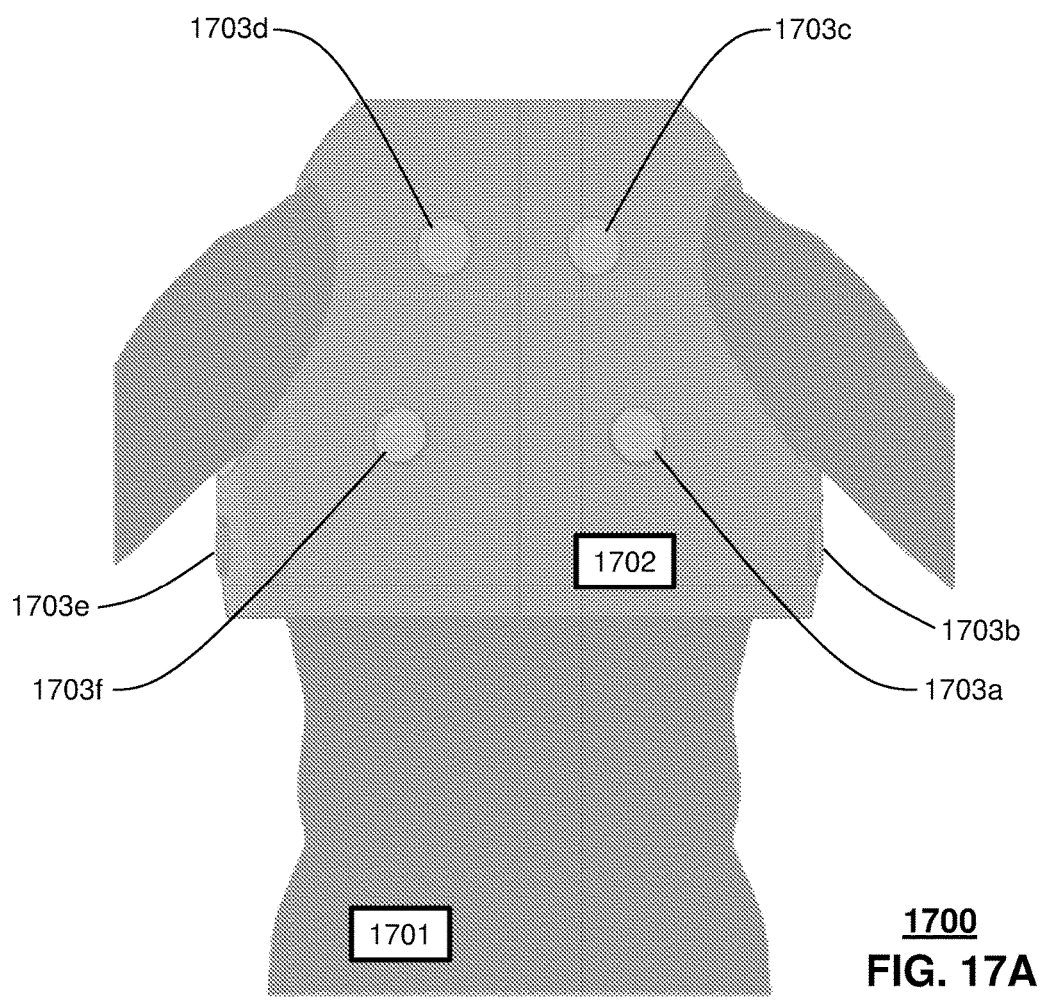
FIG. 17A depicts front view of another illustrative embodiment of a modular impact protection system used as body armor.
Figure 17B:
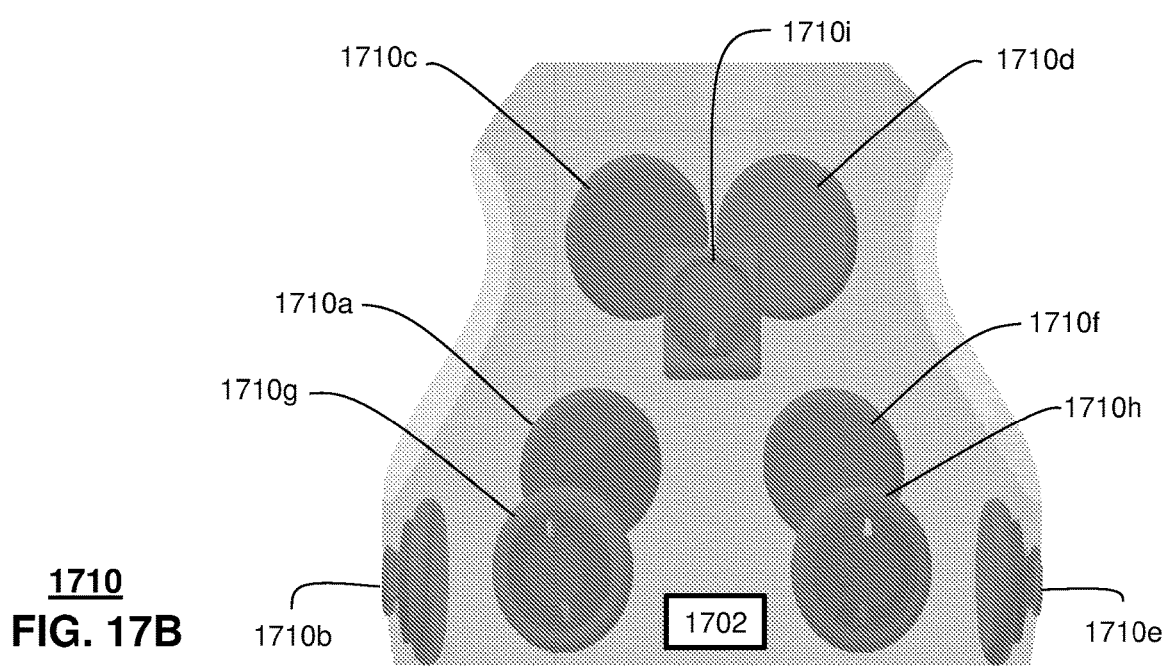
FIG. 17B depict front view of the illustrative embodiment of a modular impact protection system used as body armor shown in FIG. 17A.

FIG. 17A shows a front view of a body armor system incorporating fluid-displacement impact protection modules 1600. An outer structural shell 1702 supports modules 1 703a, 1 703b, 1 703c, 1 703d, 1 703e, 1 703f, generally 1703 in an anterior region of the body. Outer structural shell 1702 incorporates holes and or other apertures designed for incorporating fluid-displacement impact protection modules 1703. Modules 1703 can be located to protect specific areas of the user 1701.

FIG. 1 7B shows a back view of the body armor system depicted in FIG. 17A. Outer structural shell 1702 incorporates holes and or other apertures for incorporating protection modules as 1600 depicted in FIG. 1 6A. In the example embodiment, outer structural member 1601 is threaded and the holes in member 1702 are also threaded. Threaded holes are located in specific areas of the protected body, specifically, in the chest and back area of user 1701. Fluid holding members 1605 are designed to conform to different areas of the body, depending on their location.

In at least some embodiments, an impact protection process includes providing and/or assembling a helmet system that includes a protective shell that receives or otherwise experiences an impact force in response to an impact between the protective shell and another external object. The shell can include any of the various protective shells disclosed herein, such as unitary shells, sections and/or segmented shells. The providing of the helmet system, including any of the example helmet systems disclosed herein, can include providing only an operative portion of the helmet system, such as a machine, e.g., a mechanical linkage, that when combined with a protective shell, operates as described herein. Alternatively or in addition, the providing of the helmet system can include providing an assembled helmet system and/or assembling the entire system and/or at least an operative part of the helmet system, such as the machine and/or mechanisms that are actuated responsive to an impact to redirect the received impact force, and/or to absorb at least a portion of the kinetic energy of the impact.

Figure 18A:
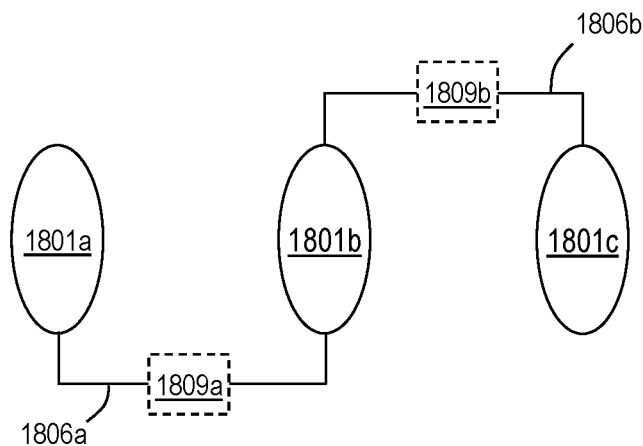
FIGS. 18A, 18B & 18C depict schematic diagrams of illustrative embodiments of modular, fluid-activated impact protection systems.
Figure 18B:
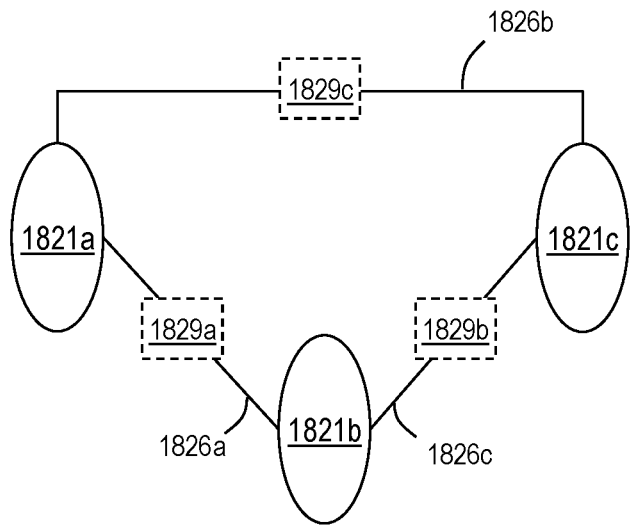
Figure 18C:
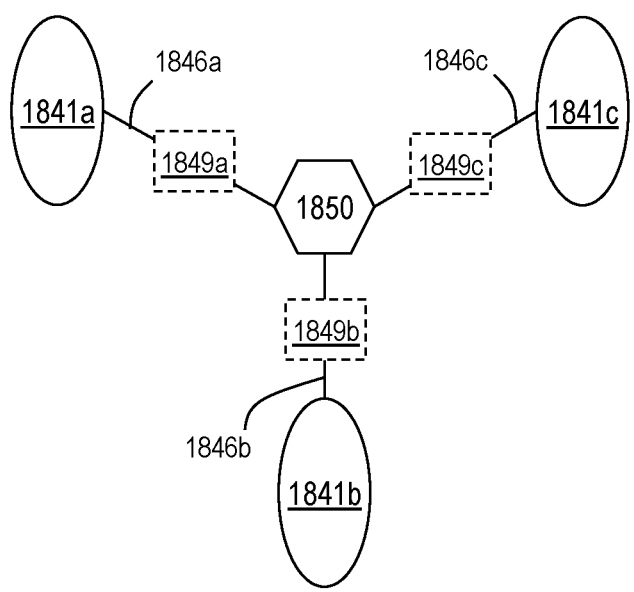

FIGS. 18A, 18B & 18C depict schematic diagrams of illustrative embodiments of modular, fluid-activated impact protection systems. In a first configuration three impact protection modules 1801a, 1801b, 1801c, generally 1801, are interconnected by two fluid links 1806a, 1806b, generally 1806. The example topology includes a series linkage, in which the first fluid link 1806a is in fluid communication between the first and second impact protection modules 1801a, 1801b. Likewise, the second fluid link 1806b is in fluid communication between the second and third impact protection modules 1801b, 1801c. A collision event that applies an impact force or load upon one or more of the impact protection modules can cause a fluid to flow between two or more of the modules 1801 by way of one or more of the fluid links 1806.

In at least some embodiments, one or more flow control modules 1809a, 1809b, generally 1809 can be applied to one or more of the fluid links 1806. In the illustrative example, a first flow control module 1809a is in fluid communication between the first and second impact protection modules 1801a, 1801b. Likewise, a second flow control module 1809b is in fluid communication between the second and third impact protection modules 1801b, 1801c. The flow control module 1809 can include a device that regulates, directs and/or controls a flow of a fluid, e.g., gases, liquids, fluidized solids, or slurries, by opening, closing, and/or partially obstructing various passageways. In some embodiments, the flow control module 1809 includes a device that allows fluid to flow in one direction, while restricting a flow in another direction, e.g., a check valve. Alternatively or in addition, the flow control module 1809 can regulate a pressure or flow downstream. It is understood that the flow control modules 1809 can include one or more of a manual valve, a solenoid valve, a motor-driven valve, a pneumatic valve and/or a hydraulic valve. The flow control modules 1809 can be self-actuated, e.g., a flapper valve, or a pressure regulator. Alternatively or in addition, the flow control modules can be actuated by other means, such as manually, mechanically, automatically, remotely, and the like.

Referring to FIG. 18B, a second system configuration 1820 three impact protection modules 1821a, 1821b, 1821c, generally 1821, are interconnected by three fluid links 1826a, 1826b, 1826c generally 1826. The example topology includes a closed circuit, in which the first fluid link 1826a is in fluid communication between the first and second impact protection modules 1821a, 1821b. A second fluid link 1826b is in fluid communication between the second and third impact protection modules 1821b, 1821c. Likewise, a third fluid link 1826c is in fluid communication between the third and first impact protection modules 1821b, 1821c. Accordingly, each impact protection module is in fluid communication with at least two other impact protection modules by way of at least two fluid links 1826.

As additional fluid impact protection modules 1821 are added to a modular system, they can be added in a pairwise fashion, e.g., in which each module is in fluid communication with two other modules. Alternatively or in addition, the fluid impact protection modules 1821 can be added according to a mesh topology in which each module is in communication with more than two other modules. In at least some embodiments, every fluid impact protection module is in fluid communication with every other fluid impact protection module by way of a dedicated fluid link between each module 1821 of the system. In at least some embodiments, some of the fluid links can include a fluid flow and or pressure module 1829a, 1829b, 1829c.

Referring to FIG. 18C, a third system configuration 1840 three impact protection modules 1841a, 1841b, 1841c, generally 1841, are each interconnected to a fluid hub or manifold 1850 by respective fluid links 1846a, 1846b, 1846c generally 1846. The example topology includes a "star" topology, in which each protection module 1841 is in fluid communication with one or more of the other protection modules 1841 by way of the fluid hub 1850. In at least some embodiments, some of the fluid links can include a fluid flow module 1849a, 1849b, 1849c.

Figure 19:
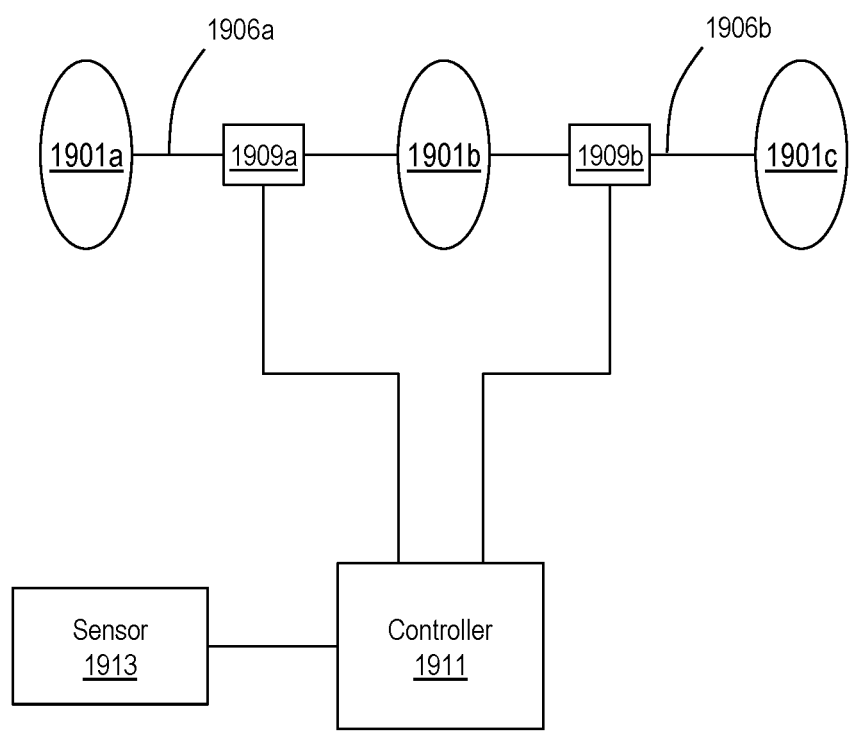
FIG. 19 depict a schematic diagram of an illustrative embodiment of a modular, fluid-activated impact protection system.

FIG. 19 depict a schematic diagram of an illustrative embodiment of a modular, fluid-activated impact protection system 1900. In a first configuration three impact protection modules 1901a, 1901b, 1901c, generally 1901, are interconnected by two fluid links 1906a, 1906b, generally 1906. The example topology includes a series linkage, in which the first fluid link 1906a is in fluid communication between the first and second impact protection modules 1901a, 1901b. Likewise, the second fluid link 1906b is in fluid communication between the second and third impact protection modules 1901b, 1901c. A collision event that applies an impact force or load upon one or more of the impact protection modules can cause a fluid to flow between two or more of the modules 1901 by way of one or more of the fluid links 1906.

In at least some embodiments, one or more flow control modules 1909a, 1909b, generally 1909 can be applied to one or more of the fluid links 1906. In the illustrative example, a first flow control module 1909a is in fluid communication between the first and second impact protection modules 1901a, 1901b. Likewise, a second flow control module 1909b is in fluid communication between the second and third impact protection modules 1901b, 1901c. The system 1900 can include a controller 1911. The controller 1911 can be in communication with one or more of the flow control modules 1909. In at least some embodiments, the controller 1911 can be in further communication with at least one sensor 1913. The controller can include one or more of a mechanical system, e.g., a vacuum control system, and an electrical system, e.g., a microprocessor control system.

In operation the controller 1911 can control operation of one or more of the flow control modules 1909. Operation can include, without restriction, allowing, blocking, restricting and/or redirecting a flow of fluid in the fluid link 1906 and/or between the protection modules 1901. The controller 1911 can control one or more of the flow modules according to predetermined methodology, e.g., according to a pre•programmed logic and/or set of machine readable instructions. In at least some embodiments, the flow control can be responsive and/or otherwise dependent upon an output of the one or more sensors 1913.

Sensors 1913 can include, without limitation, fluid flow sensors, pressure sensors, motion sensors, position sensors, orientation sensors, shock sensors, accelerometers, magnetic sensors, electric sensors. In at least some embodiments the sensors 1913 can include environmental sensors, e.g., sensing one or more of a temperature, a barometric pressure, moisture, e.g., humidity, and the like. Alternatively or in addition, at least some of the sensors 1913 can include biometric sensors, e.g., adapted to sense biometric information of a user. Example biometric sensing can include, without limitation, body temperature, salinity, moisture, pulse, blood flow.

It is understood that in at least some applications, one or more of the example force processing mechanisms reacts in one manner in response to minor impact forces, e.g., due to normal use, and in another manner in response to major impact forces that could otherwise result in injurious impacts. In at least some embodiments, the force processing mechanism 1900 can be configured to selectively react to major impact forces, without providing any substantial response to relatively minor impact forces. Alternatively or in addition, the force processing mechanism 1900 can be configured to react to any impact force, e.g., providing a scalable response based on the impact force.

In at least some embodiments, the force processing mechanism 1900 can be adapted to provide a selective response based upon operation of the controller 1911. For example, the control can include a degree of compressive force applied to the system 1900, e.g., between an outer shell of at least one of the protective modules 1901 and a protected object. Namely, the modular impact protection system 1900 reacts in one manner to a minor compressive force, e.g., below some predetermined threshold value, and in another manner to a major compressive force, e.g., above the predetermined threshold. Alternatively or in addition, the control can be based on a distance and/or volume. For example the system 1900, can be configured to provide a first response based on a separation distance between an interior surface of the module 1901 and an outer shell of the module 1901 being greater than a separation distance threshold, and a second response based on the separation distance falling below the threshold. For example, a minor impact force may result in a minor relative displacement of the surfaces, allowing the impact protection module 1901 to provide little or no response, as none may be necessary for protection of the protected object. Conversely, a major impact force may result in a substantial relative displacement of the inner and outer surfaces, causing the separation distance to fall below a threshold and allowing the system to provide a major response to protect the protected object.

FIG. 20 depicts an exemplary diagrammatic representation of a machine in the form of a computer system 2000 within which a set of instructions, when executed, may cause the machine to perform any one or more of the methods described above. One or more instances of the machine can operate, for example, as the controller 1911 and other devices of FIGS. 18-19. In some embodiments, the machine may be connected (e.g., using a network 2026) to other machines. In a networked deployment, the machine may operate in the capacity of a server or a client user machine in a server-client user network environment, or as a peer machine in a peer-to-peer (or distributed) network environment.

The machine may include a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 2000 may include a processor (or controller) 2002 (e.g., a central processing unit (CPU)), a graphics processing unit (GPU, or both), a main memory 2004 and a static memory 2006, which communicate with each other via a bus 2008. The computer system 2000 may further include a display unit 2010 (e.g., a liquid crystal display (LCD), a flat panel, or a solid state display). The computer system 2000 may include an input device 2012 (e.g., a keyboard), a cursor control device 2014 (e.g., a mouse), a disk drive unit 2016, a signal generation device 2018 (e.g., a speaker or remote control) and a network interface device 2020. In distributed environments, the embodiments described in the subject disclosure can be adapted to utilize multiple display units 2010 controlled by two or more computer systems 2000. In this configuration, presentations described by the subject disclosure may in part be shown in a first of the display units 2010, while the remaining portion is presented in a second of the display units 2010.

The disk drive unit 2016 may include a tangible computer-readable storage medium 2022 on which is stored one or more sets of instructions (e.g., software 2024) embodying any one or more of the methods or functions described herein, including those methods illustrated above. The instructions 2024 may also reside, completely or at least partially, within the main memory 2004, the static memory 2006, and/or within the processor 2002 during execution thereof by the computer system 2000. The main memory 2004 and the processor 2002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the tangible computer-readable storage medium 2022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

In at least some embodiments, the shock abatement system can be configured with clasps, locks, catches, ratchet mechanisms or the like, to retain the mechanical linkages in an extended and/or collapsed configuration, thereby preventing a transfer of stored potential energy stored in the resilient members back to the mechanical linkages. It is understood that other energy absorbing and/or dissipating techniques can be used. For example, energy of an impact force can include transforming a kinetic energy to one of a potential energy, a mechanical energy, a thermal energy, an acoustic energy, an electrical energy, a magnetic energy, or any combination thereof. Energy can be stored and or dissipated in deformations of mechanical components and/or locations and/or pressures of fluids.

It is worth noting that one or more of the example fluid capsules and/or other structural members, deformable members, resilient members, and the like, disclosed herein, can be configured to pre-stress a protective shell of an individual member and/or a protective shell common to multiple modules. Consider the example modular helmet systems that, when worn by a user, provide a stress upon a protective helmet shell through contact regions. Contact regions can include point loaded regions, e.g., at locations of the fulcra and/or pivots. Alternatively or in addition, contact regions can include extended regions, e.g., as in an arcuate or circumferential region about a mounting ring. Regardless of the particular configuration, the protective shell, e.g., the helmet, is pre-stressed. It is understood that strengths, directions and/or locations of the pre-stressing can be predetermined, e.g., according to design parameters related to placement of the machines, properties of the machines, material properties of the resilient members, and so on. By way of further example, one or more of the fluid capsules, inter-module linkages and/or intra•module linkages can be adapted to provide a measured pre-stressing of the helmet shell.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An impact protection device, comprising:
an outer structural member;
a machine operatively coupled to the outer structural member;
wherein an impact to the outer structural member results in a controlled movement between the machine and the outer structural member;
a fluid holding member adapted to store a fluid;
wherein the controlled movement between the machine and the outer structural member results in a deformation of the fluid holding member;
wherein the controlled movement dictates a damping profile that defines a portion of kinetic energy of the impact that is dissipated; and
a control module that regulates the transfer of the fluid.

2. The impact protection device of claim 1, wherein the machine comprises at least one lever.

3. The impact protection device of claim 1, wherein the machine comprises at least one cam that defines said damping profile.

4. The impact protection device of claim 1, wherein the outer structural member comprises a unitary helmet shell.

5. The impact protection device of claim 1, wherein the outer structural member comprises a section of a helmet shell.

6. The impact protection device of claim 1, wherein the outer structural member comprises a unitary body armor.

7. The impact protection device of claim 1, wherein the outer structural member comprises a section of a body armor.

8. The impact protection device of claim 1, further comprising a controller in communication with the control module, wherein the fluid transfer is controlled at least in part based on operation of the controller.

* * * * *